United States Patent
Aoki

(10) Patent No.: US 10,991,367 B2
(45) Date of Patent: Apr. 27, 2021

(54) VOICE ACTIVATED ASSISTANT ACTIVATION PREVENTION SYSTEM

(71) Applicant: PAYPAL, INC., San Jose, CA (US)

(72) Inventor: Norihiro Edwin Aoki, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 34 days.

(21) Appl. No.: 15/857,012

(22) Filed: Dec. 28, 2017

(65) Prior Publication Data

US 2019/0206395 A1 Jul. 4, 2019

(51) Int. Cl.
| | |
|---|---|
| G10L 15/22 | (2006.01) |
| G10L 15/30 | (2013.01) |
| H04R 3/00 | (2006.01) |
| G10L 25/51 | (2013.01) |
| H04R 1/40 | (2006.01) |
| H04R 27/00 | (2006.01) |

(52) U.S. Cl.
CPC .............. *G10L 15/22* (2013.01); *G10L 15/30* (2013.01); *G10L 25/51* (2013.01); *H04R 3/005* (2013.01); *G10L 2015/223* (2013.01); *H04R 1/406* (2013.01); *H04R 27/00* (2013.01); *H04R 2227/003* (2013.01); *H04R 2430/23* (2013.01)

(58) Field of Classification Search
CPC ......... G10L 15/22; G10L 15/30; G10L 25/51; G10L 2015/223; H04R 1/406; H04R 3/005; H04R 27/00; H04R 2227/003; H04R 2430/23; H04L 63/1483; H04L 63/10; H04L 41/0893; G06Q 30/06; G06Q 30/0641
See application file for complete search history.

(56) References Cited

U.S. PATENT DOCUMENTS

| | | | |
|---|---|---|---|
| 10,074,364 B1 * | 9/2018 | Wightman | G10L 17/04 |
| 10,074,381 B1 * | 9/2018 | Cowburn | G10L 15/26 |
| 10,374,816 B1 * | 8/2019 | Leblang | H04L 12/1822 |
| 2009/0141908 A1 * | 6/2009 | Jeong | G01S 5/20 381/92 |
| 2015/0067163 A1 * | 3/2015 | Bahnsen | G01S 5/02 709/225 |
| 2015/0301796 A1 * | 10/2015 | Visser | G10L 15/22 715/728 |
| 2017/0242657 A1 * | 8/2017 | Jarvis | G06F 3/165 |
| 2019/0371330 A1 * | 12/2019 | Lin | G10L 25/21 |

* cited by examiner

*Primary Examiner* — Michelle M Koeth
(74) *Attorney, Agent, or Firm* — Haynes and Boone, LLP

(57) ABSTRACT

A voice activated assistant activation prevention system includes a database storing audio source information describing a relative location of an audio source. The system is configured to monitor, using at least one microphone, for an activation command that is associated with a recording of a subsequent instruction command and a sending that subsequent instruction command through a network. When the system detects, using first audio information received by the at least one microphone, a first instance of the activation command, it determines a source location of the first instance of the activation command. If the system matches the source location of the first instance of the activation command to the relative location of the audio source described by the audio source information in the database, the system may prevent the sending though the network of an instruction command that immediately follows the first instance of the activation command.

20 Claims, 15 Drawing Sheets

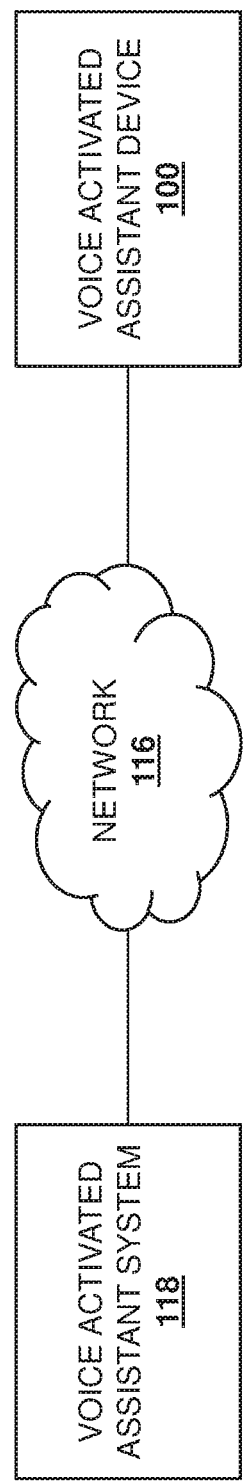

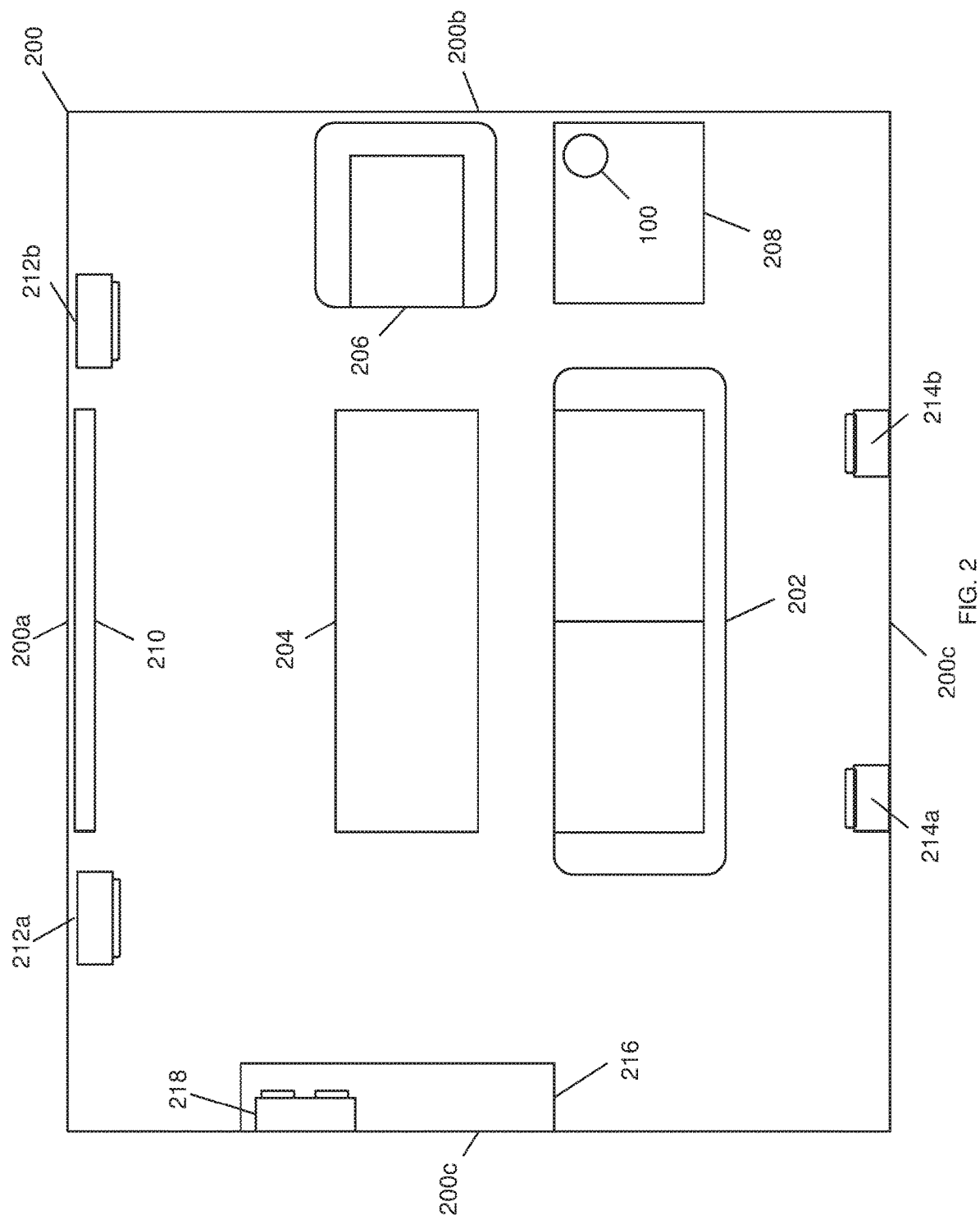

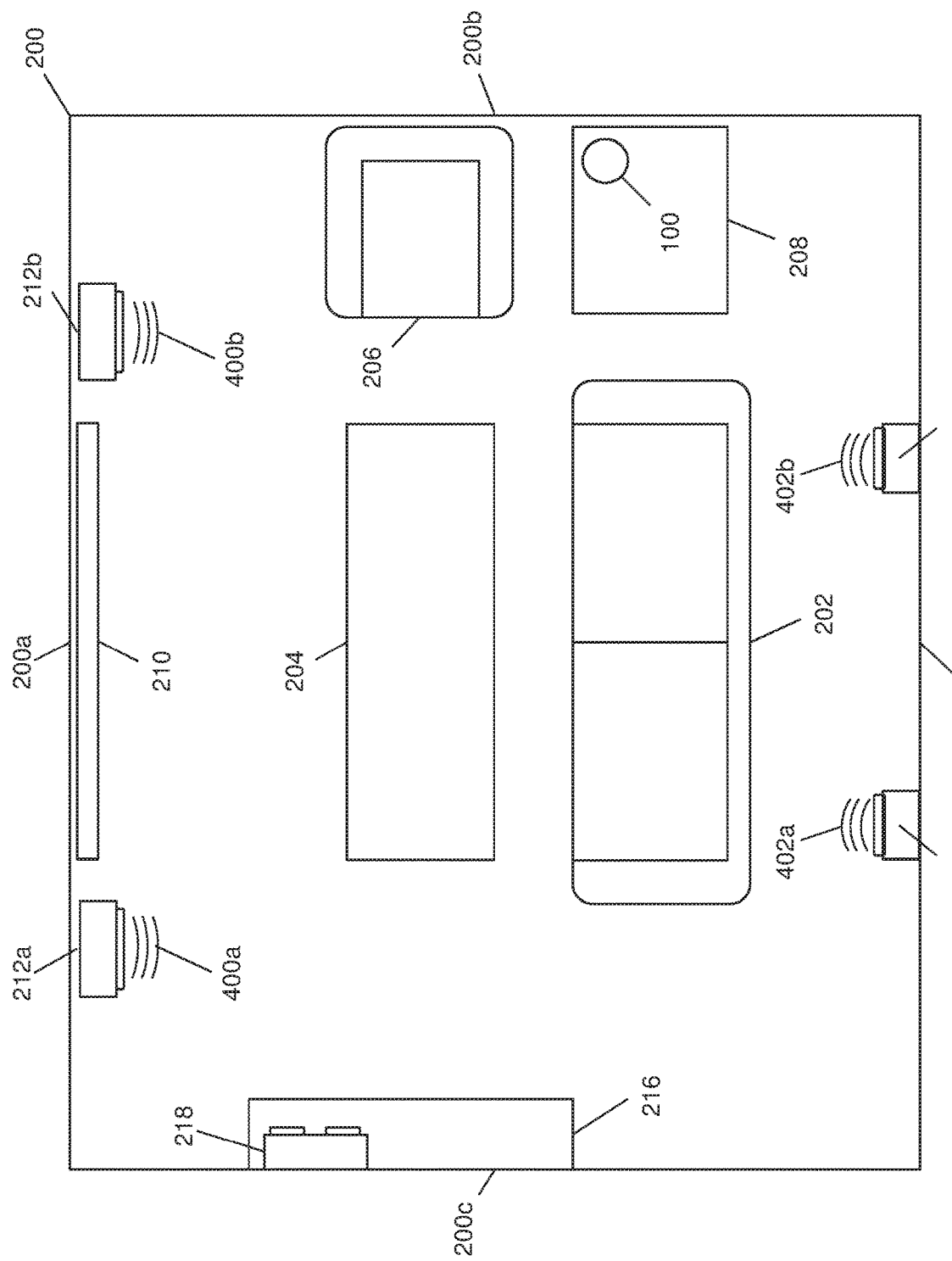

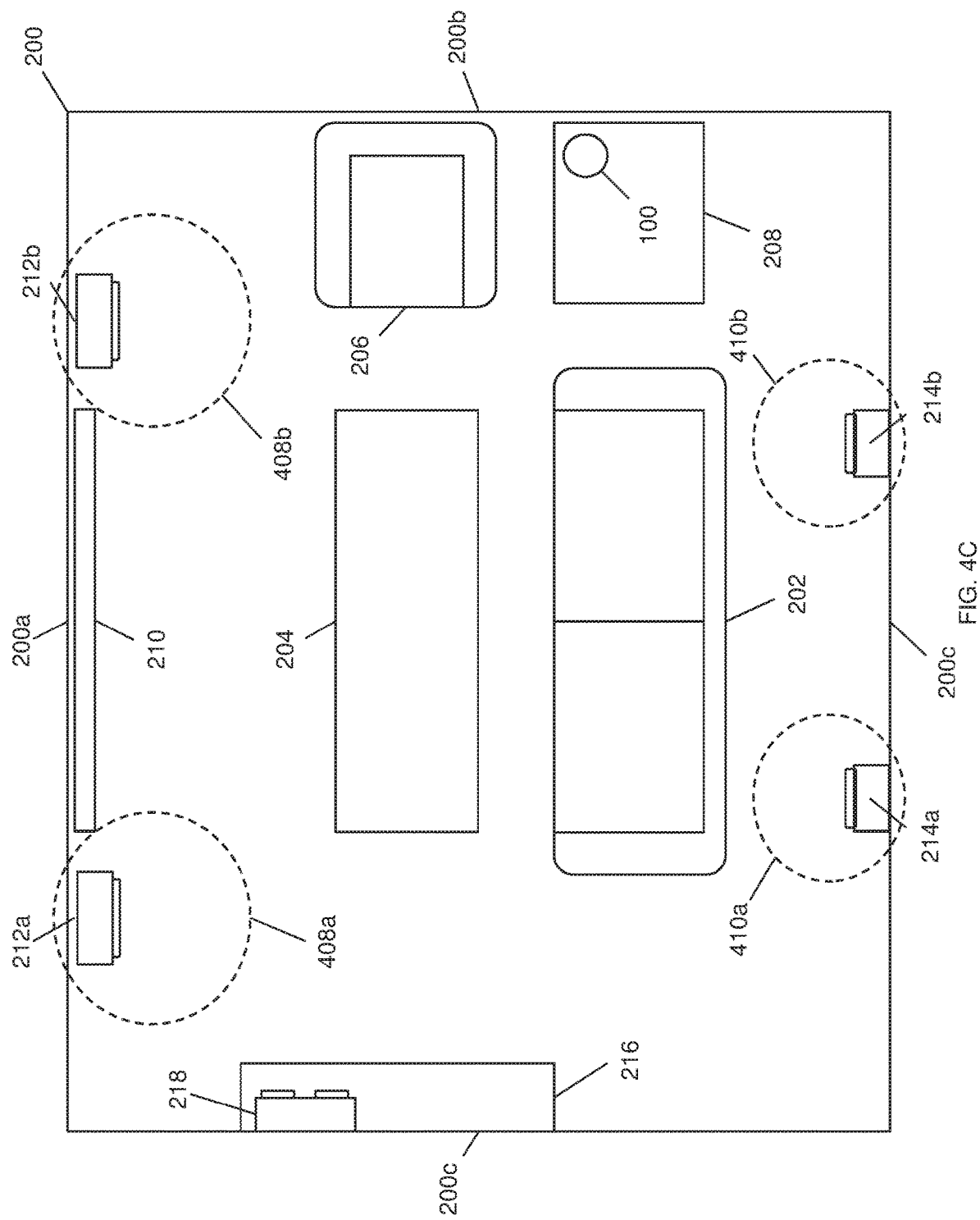

VOICE ACTIVATED ASSISTANT ACTIVATION PREVENTION SYSTEM

BACKGROUND

Field of the Disclosure

The present disclosure generally relates to voice activated devices, and more particularly to preventing unintended or unauthorized activation of such voice activated devices.

Related Art

More and more users are utilizing voice activated assistant devices such as, for example, the AMAZON® ECHO® available from AMAZON®, Inc. of Seattle, Wash., United States: the GOOGLE® HOME® available from GOOGLE®, Inc. of Mountain View, Calif., United States; and the APPLE® HOMEPOD® available from APPLE®, Inc. of Cupertino, Calif., United States. Such voice activated assistant devices can be used for an ever increasing number of functions or actions and are typically positioned in a room of a user's home, and utilize microphones to detect an activating word/phrase that causes the voice activated assistant device to then record any subsequent commands for processing by a network connected server system. This allows the user to speak commands out loud in order to have the network connected server system carry out those commands to perform, for example, an online payment (e.g., in response to the user speaking the instruction "([activating word/phrase], buy more soda").

However, it has been found that such voice activated assistant devices may be maliciously or accidentally activated via intentional but unauthorized speaking of the activating word/phrase, or the speaking of words or phrases that sound like the activating word/phrase, which can result in unwanted recording of any subsequently spoken words, and possibly an unauthorized transaction or action being performed by the network connected server system. As voice activated assistant devices become more and more prevalent, such unauthorized activation becomes a bigger and bigger problem, subjecting users to privacy violations (due to the recording of subsequently spoken words after the unauthorized activation word/phrase), and subjecting users and merchants to unauthorized transactions that then must be reversed.

Thus, there is a need for an improved voice activated assistant device.

BRIEF DESCRIPTION OF THE FIGURES

FIG. 1B is a schematic view illustrating and embodiment of the voice activated assistant device of FIG. 1A coupled to a voice activated assistant system through a network.

FIG. 2 is a schematic view illustrating an embodiment of room within which the voice activated assistant device of FIGS. 1A and 1B may be positioned;

FIG. 4A is a schematic view illustrating an embodiment of audio devices providing audio sources in the room of FIG. 2;

FIG. 4C is a schematic view illustrating an embodiment of detection of the directionality and distance of the audio sources of FIG. 4A by the voice activated assistant device of FIG. 1;

Figure 1A:
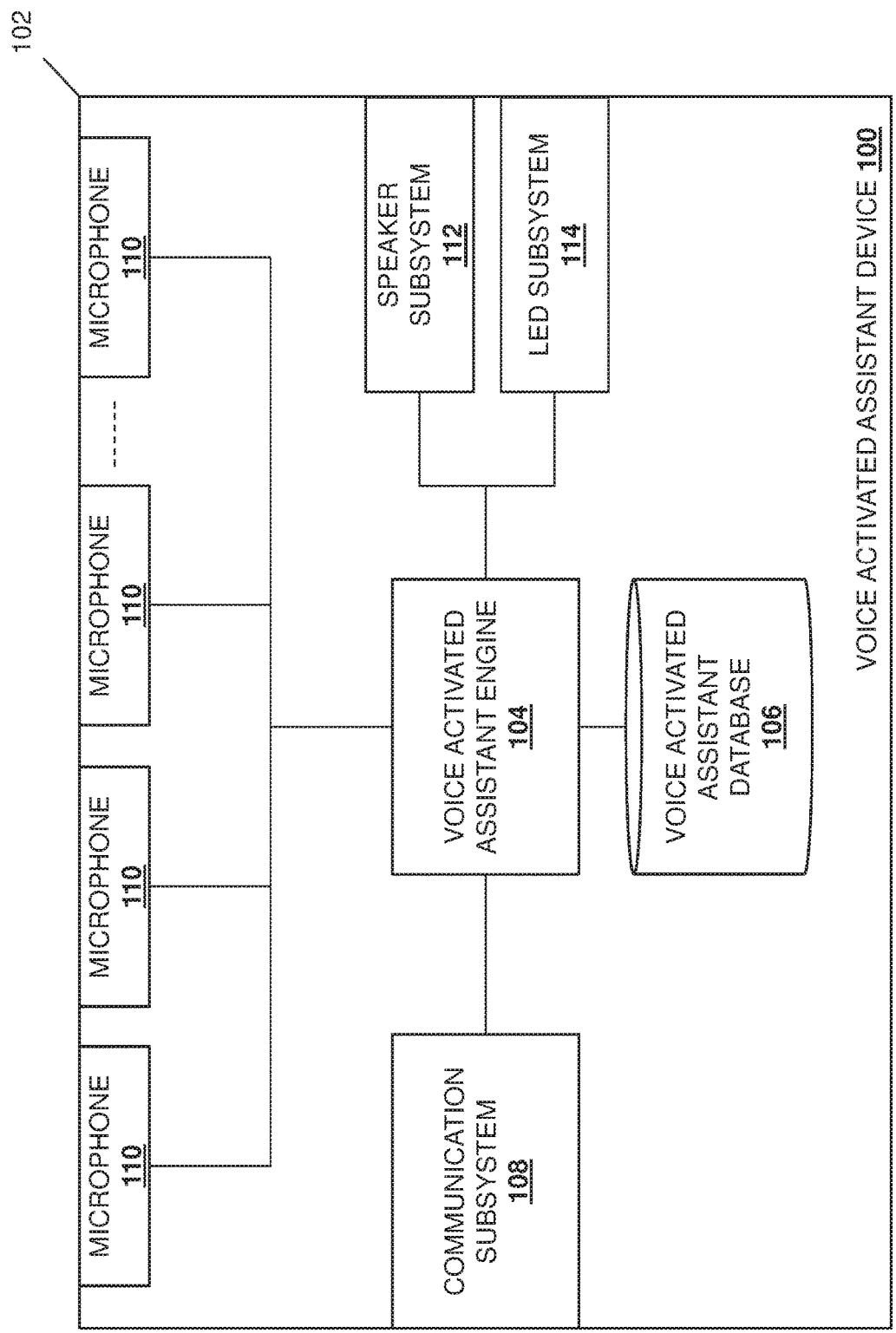
FIG. 1A is a schematic view illustrating an embodiment of a voice activated assistant device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for preventing unintended or unauthorized activation of a voice activated assistant device by identifying the locations of particular audio sources relative to the voice activated assistant device such that when an activation command is detected and it is determined that it originated from one of those audio source relative locations, the system may prevent the voice activated assistant from sending any instruction command that is detected immediately following the activation command. In some examples, the detection of the activation command and determination that it originated from one of the audio source relative locations causes the system to prevent the voice activated assistant device from recording any subsequent instruction command that is detected immediately following the activation command, while in other examples, the voice activated assistant device may record that instruction command and then prevent it from being sent through the network. As such, privacy associated with voice activated assistant devices may be enhanced, and unauthorized activation commands are prevented from causing the execution of subsequent instruction commands, thus reducing the occurrence of the execution of unauthorized instruction commands that can result in, for example, unwanted or fraudulent transactions. As such, activation commands that are provided by audio sources such as television speakers or radios, and that may result from an intentional prank or unintentional use of the activation command (or words/phrases that sound like the activation command), may be prevented for resulting in the sending of any subsequent instruction command through a network.

Referring now to FIG. 1A, an embodiment of a voice activated assistant device 100 is illustrated. In different embodiments, the voice activated assistant device 100 may be provided by enhancing the functionality of voice activated assistant devices such as, for example, the AMAZON® ECHO® available from Amazon, Inc. of Seattle, Wash., United States; the GOOGLE® HOME® available from Google, Inc. of Mountain View, Calif., United States; and the APPLE® HOMEPOD® available from Apple, Inc. of Cupertino, Calif., United States. In the illustrated embodiment, the voice activated assistant device 100 includes a chassis 102 that houses the components of the voice activated assistant device 100, only some of which are illustrated in FIG. 1A. For example, the chassis 102 may house a processing system (not illustrated, but which may include one or more hardware processors known in the art) and a non-transitory memory system (not illustrated, but which may include one or more memory devices known in the art) that is coupled to the processing system and that includes instructions that, when executed by the processing system, cause the processing system to provide a voice activated assistant engine 104 that is configured to perform the functions of the voice activated assistant engines and voice activated assistant devices discussed below.

The chassis 102 may also house a storage system (not illustrated, but which may include one or more storage devices known in the art) that is coupled to the voice activated assistant engine 104 (e.g., via a coupling between the storage system and the processing system) and that includes a voice activated assistant database 106 that is configured to store any of the information discussed below that is used to provide the functionality described below. The chassis 102 may also house a communication subsystem 108 that is coupled to the voice activated assistant engine 104 (e.g., via a coupling between the communication subsystem 108 and the processing system) and that may include a wireless communication subsystem such as a WiFi communication subsystem, a BLUETOOTH® communication subsystem, a Near Field Communication (NFC) subsystem, and/or other wireless communication subsystems known in the art. The chassis 102 may also house a plurality of microphones 110 that are coupled to the voice activated assistant engine 104 (e.g., via a coupling between the microphones 110 and the processing system), a speaker subsystem 112 that is coupled to the voice activated assistant engine 104 (e.g., via a coupling between the speaker subsystem 112 and the processing system), and a light emitting device (LED) subsystem 114 that is coupled to the voice activated assistant engine 104 (e.g., via a coupling between the LED subsystem 114 and the processing system). In one example, the plurality of microphones 110 may be positioned on the chassis 102 in a manner (e.g., a spaced apart, circular orientation about a cylindrical chassis, or a chassis with a substantially circular cross section) to enable the detection of audio from different direction, although a variety of other microphone configurations for enabling the functionality discussed above with fall within the scope of the present disclosure as well.

With reference to FIG. 1B, the voice active assistant device 100 is illustrated as coupled through a network 116 (e.g., the Internet) to a voice activated assistant system 118. In some embodiments, the voice activated assistant system 118 may be provided by one or more server devices operated by a voice activated assistant device provider, although other systems that provide the functionality of the voice activated assistant system discussed below will fall within the scope of the present disclosure as well. While a specific voice activated assistant device 100, and its network connection to a voice activated assistant system 118, has been illustrated and described, one of skill in the art in possession of the present disclosure will recognize that a variety of other device and/or system configurations may be utilized to provide the functionality discussed below while remaining within the scope of the present disclosure.

Referring now to FIG. 2, an embodiment of a room 200 is illustrated within which a voice activated assistant device may be positioned relative to audio devices that provide audio sources. However, one of skill in the art in possession of the present disclosure will recognize that voice activated assistant devices may be positioned in a variety of different locations and perform the functionality discussed below while remaining within the scope of the present disclosure. In the specific embodiment of the room 200 illustrated in FIG. 2, the room 200 includes a plurality of walls 200a, 200b, 200c, and 200d that define the room 200. A couch 202 and a coffee table 204 are substantially centrally located in the room 200, with a chair 206 positioned immediately adjacent the wall 200b and between the wall 200b and the coffee table 204. A side table 208 is positioned immediately adjacent the wall 200b, between the wall 200b and the couch 202, and adjacent the chair 206. In the illustrated embodiment, the voice activated assistant device 100 is positioned on the side table 208 and adjacent the wall 200b.

The specific embodiment of the room 200 illustrated in FIG. 2 also includes a television 210 that is mounted to the wall 200a. In the examples discussed below, the television 210 is configured to operate to produce video images in cooperation with audio produced by a plurality of external speaker devices including the front speaker devices 212a and 212b that are positioned immediately adjacent the wall 200a and on either side of the television 210, and the rear speaker devices 214a and 214b that are mounted to the wall 200c and opposite the room 200 from the television 210 and front speaker devices 212a and 212b. However, one of skill in the art in possession of the present disclosure will recognize that the television 210 may operate using internal speaker devices that produce audio while remaining within the scope of the present disclosure as well. The specific embodiment of the room 200 illustrated in FIG. 2 also includes a console table 216 that is positioned immediately adjacent the wall 200c, and a radio device 218 that is positioned on the console table 216.

As discussed in further detail below, the specific example of the room 200 including the front speaker devices 212a and 212b, the rear speaker devices 214a and 214b, and the radio device 218 is illustrated for the discussion below of how the voice activated assistant device 100 operates to prevent audio sources in a room from unintentionally activating and/or providing instructions to the voice activated assistant device 100 that are subsequently executed by the voice activated assistant system 118. However, one of skill in the art in possession of the present disclosure will recognize that there are a wide variety of spaces in which voice activated assistant devices may be used and that may include a wide variety of audio sources provided in a wide variety of configurations, and voice activated assistant devices may benefit from the teachings of the present disclosure while positioned in any of those spaces with any of those audio sources in any of those configurations while remaining within the scope of the present disclosure.

Figure 3:
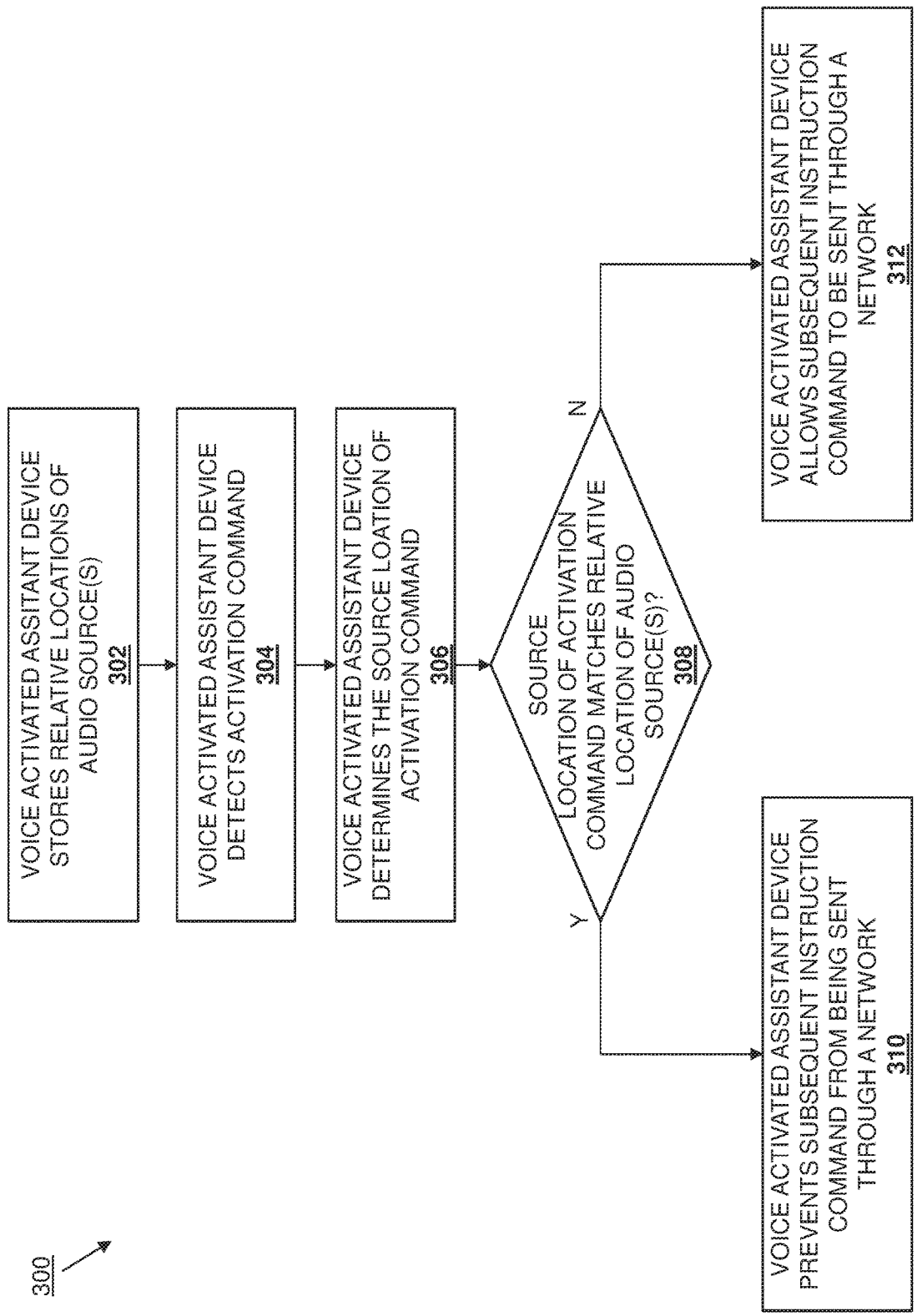
FIG. 3 is a flow chart illustrating an embodiment of a method for preventing activation of a voice operated assistant device.

Referring now to FIG. 3, an embodiment of a method 300 for preventing activation of a voice activated assistant device is illustrated. As discussed below, an intelligent voice activated assistant device may be configured to identify and recognize locations where televisions, radios, computers, or other audio generating devices can produce audio output, and then utilize those relative locations when an activation command is detected to determine whether to ignore subsequent instruction commands detected at that same relative location. In some embodiments, the determination of the relative locations of audio sources may be performed in response to a user defining those relative locations, while in other embodiments, the voice activated assistant device may control those audio sources in order to produce audio that allows for the defining of those relative locations. Actions taken upon the detection of an activation command from a stored audio source relative location include preventing the recording of a subsequent instruction command provided from an audio source at that relative location, the preventing of the sending through a network of a subsequent instruction command that was recorded from an audio source at that relative location, the requesting of a confirmation of a subsequent instruction command that was recorded from an audio source at that relative location, and/or other actions that would be apparent to one of skill in the art in possession of the present disclosure. As such, voice activated assistant device technology is advanced by preventing the voice activated assistant device from being activated by audio emitted via unauthorized audio sources.

The method 300 begins at block 302 where the voice activated assistant device stores the relative location of one or more audio devices. In the embodiment discussed below, at block 302, the voice activated assistant engine 104 in the voice activated assistant device 100 operates to store the relative location of one or more audio sources in the voice activated assistant database 106. However, as also discussed below, in other embodiments the voice activated assistant engine 104 in the voice activated assistant device 100 may operate to store the relative location of one or more audio sources by sending information of relative location(s) of the one or more audio sources through the network 116 to the voice activated assistant system 118 for storage. As such, in some embodiments, the relative locations of the one or more audio source may be stored locally in the voice activated assistant device 100, while in other embodiments the relative locations of the one or more audio sources may be stored externally such as, for example, on a network connected storage device.

As detailed below, the determination of the relative locations of the audio sources may be performed in a variety of manners. While a few specific examples are illustrated and provided below, one of skill in the art in possession of the present disclosure will recognize that the determination of the relative locations of audio sources in similar manners that are not explicitly described herein will fall within the scope of the present disclosure as well. In one example, the voice activated assistant engine 104 may be configured to control the front speaker devices 212a and 212b, the rear speaker devices 214a and 214b, and/or the radio device 218 in order to produce audio. For example, prior to block 302, the voice activated assistant engine 104 may be "paired", linked, and/or otherwise connected to the front speaker devices 212a and 212b, the rear speaker devices 214a and 214b, and/or the radio device 218 (or other devices that control those devices such as, for example, the television 210) via its communication subsystem 108 (e.g., via a BLUETOOTH® connection, an NFC connection, a WiFi connection, etc.).

With reference to FIG. 4A, at block 302 the voice activated assistant engine 104 may use the communication subsystem 108 to control the front speaker devices 212a and 212b and/or the rear speaker devices 214a and 214b (e.g., either directly or via the television 210) and cause the front speaker devices 212a/212b and the rear speakers 214a/214b to produce audio, as indicated by the elements 400a and 400b associated with the front speaker devices 212a and 212b in FIG. 4A, and the elements 402a and 402b associated with the rear speaker devices 214a and 214b in FIG. 4A. In some embodiments the audio produced by the voice activated assistant engine 104 via control of the front speaker devices 212a/212b and the rear speakers 214a/214b at block 302 may include a predetermined pitch, duration, loudness, timbre, sonic texture, spatial location, and/or any of a variety of other audio characteristics known in the art that enable the voice activated assistant engine 104 to more easily make the directionality and/or distance determinations discussed herein. Similarly, with reference to FIG. 5A, at block 302 the voice activated assistant engine 104 may use the communication subsystem 108 to control the radio device 218 and cause the radio device 218 to produce audio, as indicated by the element 500 in FIG. 5A. Similarly as discussed above, in some embodiments, the audio produced by the voice activated assistant engine 104 via control of the radio device 500 at block 302 may include a predetermined pitch, duration, loudness, timbre, sonic texture, spatial location, and/or any of a variety of other audio characteristics known in the art.

Figure 4B:
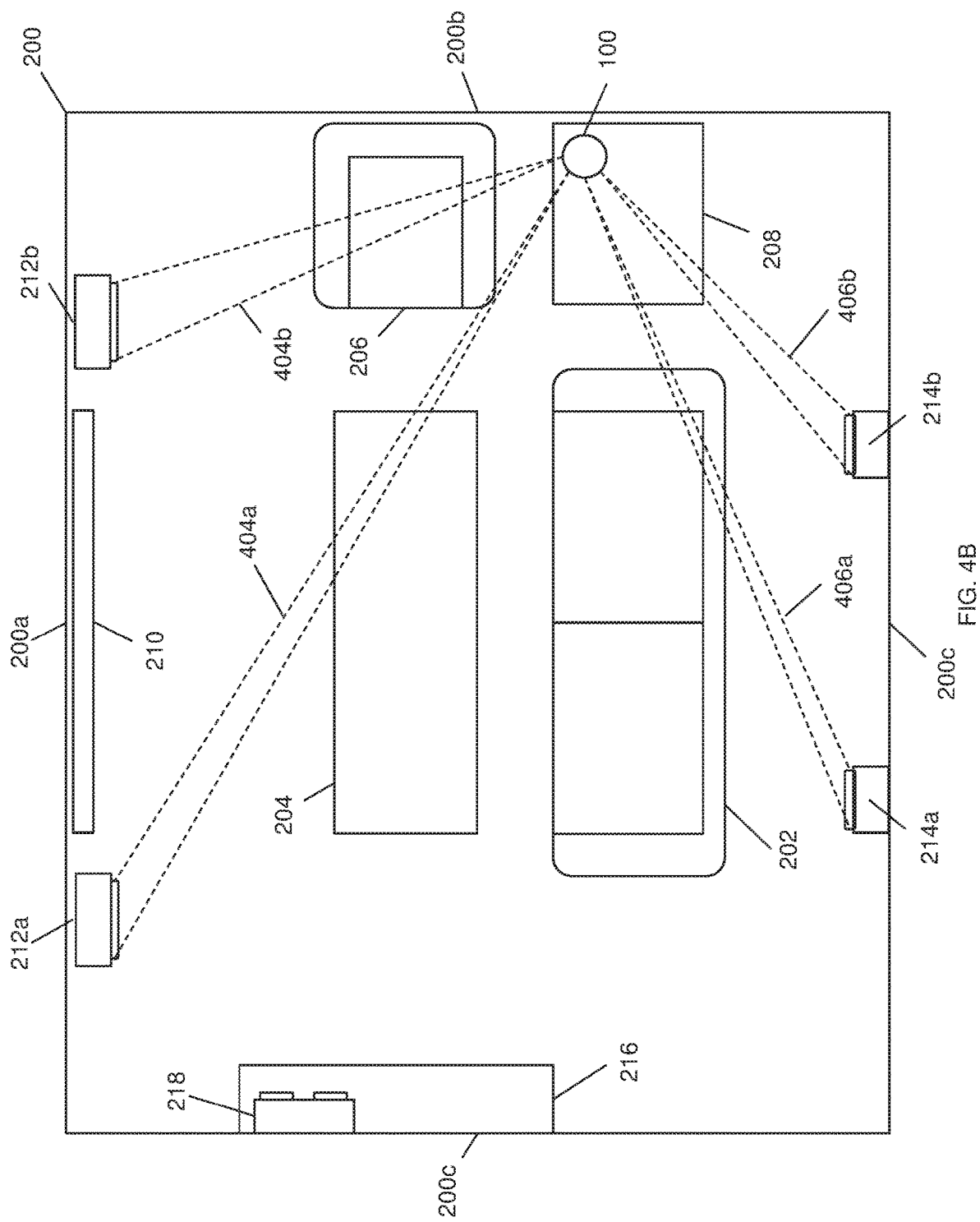
FIG. 4B is a schematic view illustrating an embodiment of detection of the directionality of audio sources of FIG. 4A by the voice activated assistant device of FIG. 1.
Figure 5A:
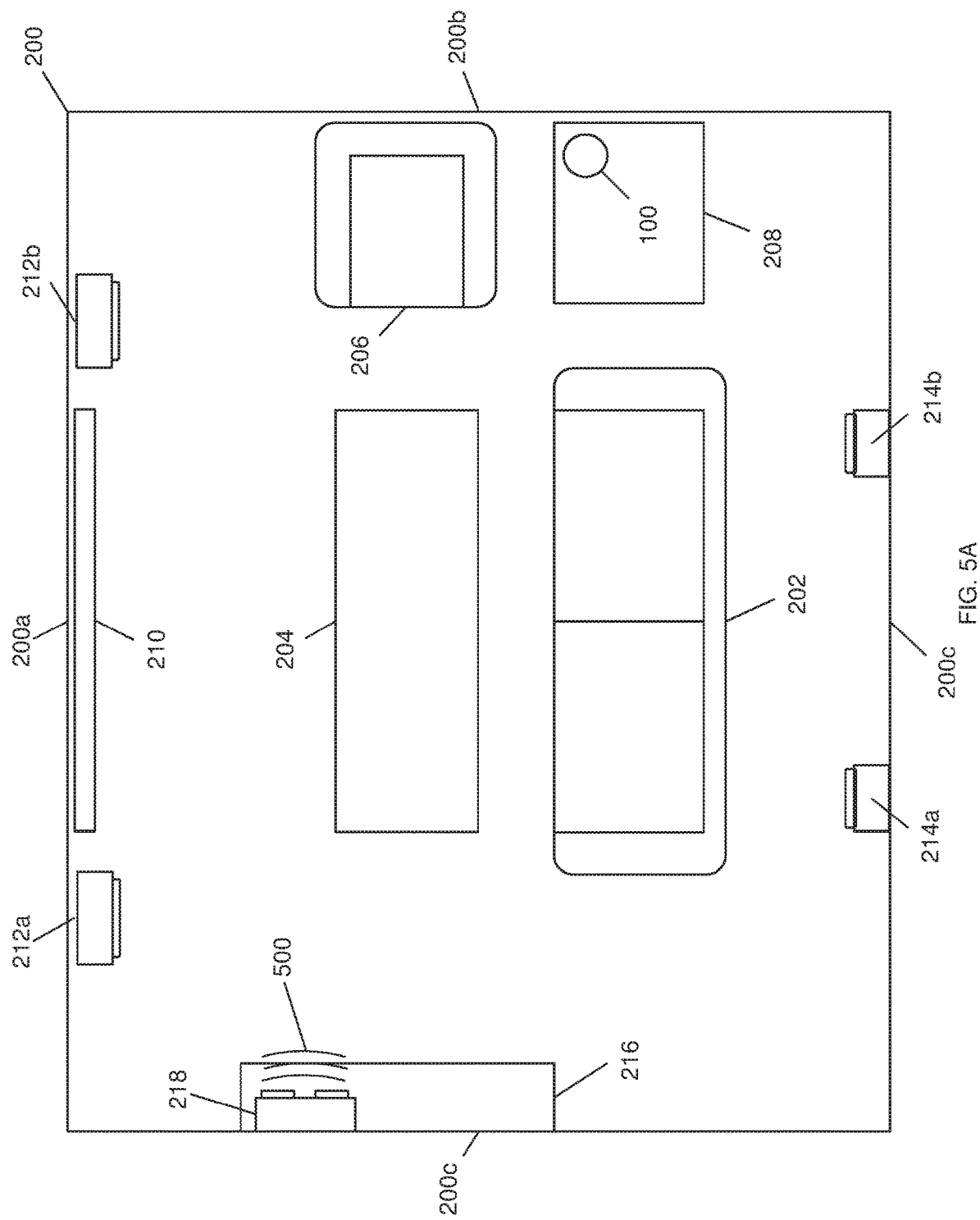
FIG. 5A is a schematic view illustrating an embodiment of an audio device providing an audio source in the room of FIG. 2.

Following its control of the front speaker devices 212a/212b, the rear speakers 214a/214b, and/or the radio device 218 to produce the audio illustrated in FIGS. 4A and 5A, the voice activated assistant engine 104 may utilize the microphones 110 to detect that audio in order to define one or more audio sources and determine their locations relative to the voice active assistant device 100. FIG. 4B illustrates an embodiment of the voice activated assistant engine 104 utilizing the microphones 110 to detect the audio produced by the front speaker devices 212a/212b and rear speaker devices 214a/214b as illustrated in FIG. 4A in order to define corresponding audio sources and determine their relative locations. For example, the configuration of the microphones 110 on the chassis 102 of the voice activated assistant device 100 may provide for the detection of the audio by any subset (or all) of the microphones 110, and the voice activated assistant engine 104 may be configured to utilize that detected audio to determine a directionality of the audio source providing that audio using, for example, triangulation techniques that are based on the relative differences in the time required for the same audio to reach the different microphones 110. However, while a particular technique for determining the directionality of detected audio sources has been described, one of skill in the art in possession of the present disclosure will recognize that other techniques for determining a relative location of an audio source will fall within the scope of the present disclosure as well.

As such, FIG. 4B illustrates the voice activated assistant engine 104 determining a directionality 404a of the audio source provided by the front speaker device 212a, a directionality 404b of the audio source provided by the front speaker device 212b, a directionality 406a of the audio source provided by the rear speaker device 214a, and a directionality 406b of the audio source provided by the rear speaker device 212b. Thus, at block 302, respective relative locations of audio sources may be determined that include directionality information that describes the directionality 404a, 404b, 406a, and 406b, and that directionality information may be stored in the voice activated assistant database 106 as directionality coordinates, audio information associated with any of the microphones 110, and/or a variety of other information that would be apparent to one of skill in the art in possession of the present disclosure as providing for the identification of the directionality 404a, 404b, 406a, and 406b of the audio sources discussed above.

Figure 5B:
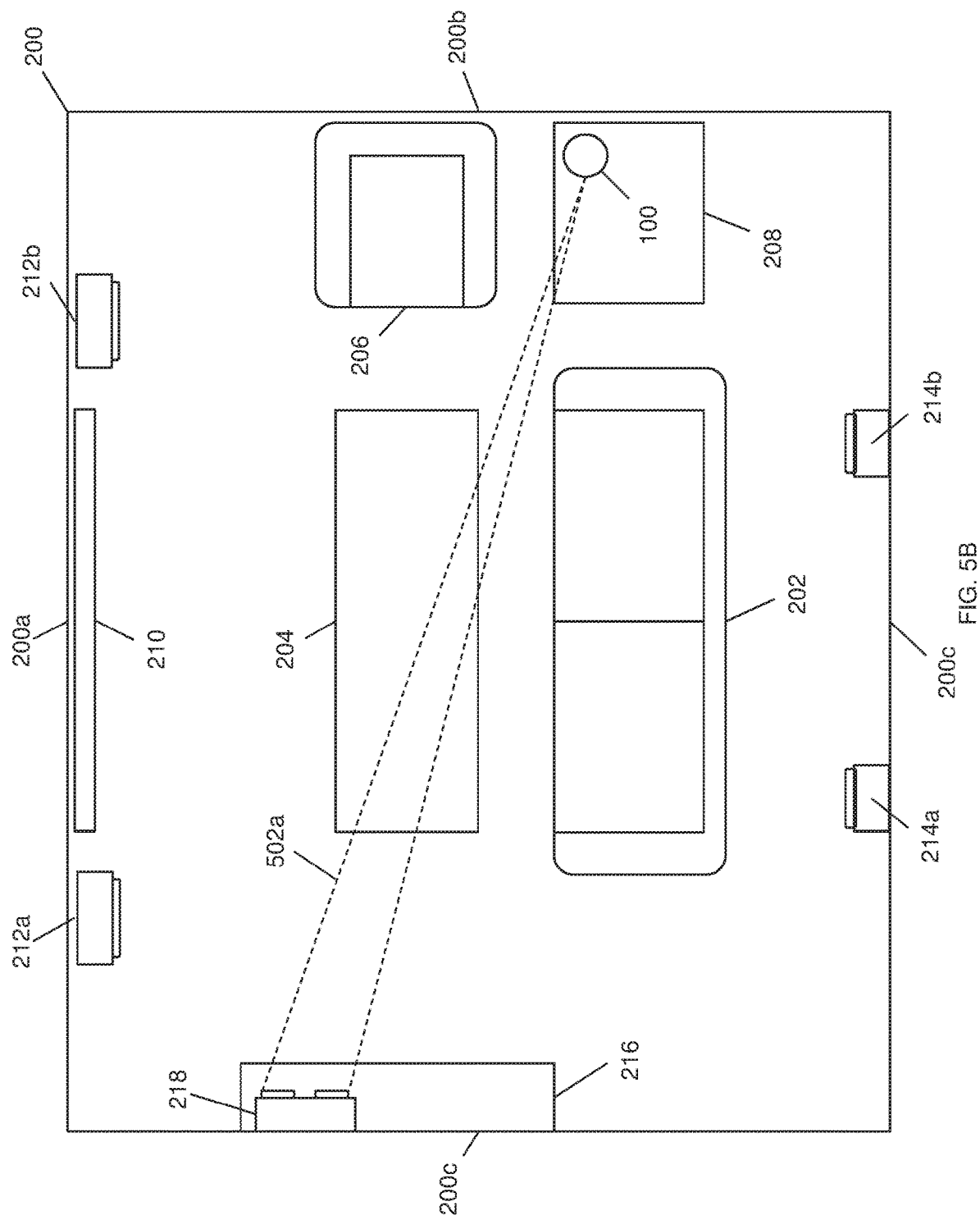
FIG. 5B is a schematic view illustrating an embodiment of detection of the directionality of the audio source of FIG. 5A by the voice activated assistant device of FIG. 1.

FIG. 5B illustrates an embodiment of the voice activated assistant engine 104 utilizing the microphones 110 to detect the audio produced by the radio device 218 as illustrated in FIG. 5A in order to define a corresponding audio source and determine its relative location. Similarly as discussed in the example above, the configuration of the microphones 110 on the chassis 102 of the voice activated assistant device 100 may provide for the detection of the audio by any subset (or all) of the microphones 110, and the voice activated assistant engine 104 may be configured to utilize that detected audio to determine a directionality of the audio source providing that audio using, for example, triangulation techniques that are based on the relative differences in the time required for the same audio to reach the different microphones 110. As such, FIG. 5B illustrates the voice activated assistant engine 104 determining a directionality 502a of the audio source provided by the radio device 218. Thus, at block 302, a relative location of an audio source may be determined that includes directionality information that describes the directionality 502a, and that directionality information may be stored in the voice activated assistant database 106 as directionality coordinates, audio information associated with any of the microphones 110, and/or a variety of other information that would be apparent to one of skill in the art in possession of the present disclosure as providing for the identification of the directionality 502a of the audio source discussed above.

FIG. 4C illustrates an embodiment of the voice activated assistant engine 104 utilizing the microphones 110 to detect the audio produced by the front speaker devices 212a/212b and rear speaker devices 214a/214b as illustrated in FIG. 4A in order to define corresponding audio sources and determine their relative locations. For example, the configuration of the microphones 110 on the chassis 102 of the voice activated assistant device 100 may provide for the detection of the audio by any subset (or all) of the microphones 110, and the voice activated assistant engine 104 may be configured to utilize that detected audio along with the characteristics of the audio created under its control in order to determine a distance and directionality of the audio source of that audio using, for example, the triangulation techniques discussed above, as well as known volume characteristics of the audio that was produced by the audio sources under control the voice activated assistant engine 104. However, while a particular technique for determining the directionality and distance of detected audio sources has been described, one of skill in the art in possession of the present disclosure will recognize that other techniques for determining a relative location of an audio source will fall within the scope of the present disclosure as well.

As such, FIG. 4C illustrates the voice activated assistant engine 104 determining an area/volume 408a of the audio source provided by the front speaker device 212a using the distance and directionality determined for its detected audio, an area/volume 408b of the audio source provided by the front speaker device 212b using the distance and directionality determined for its detected audio, an area/volume 410a of the audio source provided by the rear speaker device 214a using the distance and directionality determined for its detected audio, and an area/volume 410b of the audio source provided by the rear speaker device 214b using the distance and directionality determined for its detected audio. For example, the areas/volumes 408a, 408b, 410a, and 410b may be determined by estimating a location of the detected audio source based on the directionality and distance discussed above, and then defining the area/volume based on that location (e.g., defining a circular area or spherical volume with a boundary that is based on that location as illustrated in FIG. 4C). Area/volume information associated with the areas/volumes 408a, 408b, 410a, and 410b may then be stored in the voice activated assistant database 106 as area/volume coordinates, audio information associated with any of the microphones 110, and/or a variety of other information that would be apparent to one of skill in the art in possession of the present disclosure as providing for identification of the areas/volumes 408a, 408b, 410a, and 410b of the audio sources discussed above.

Figure 5C:
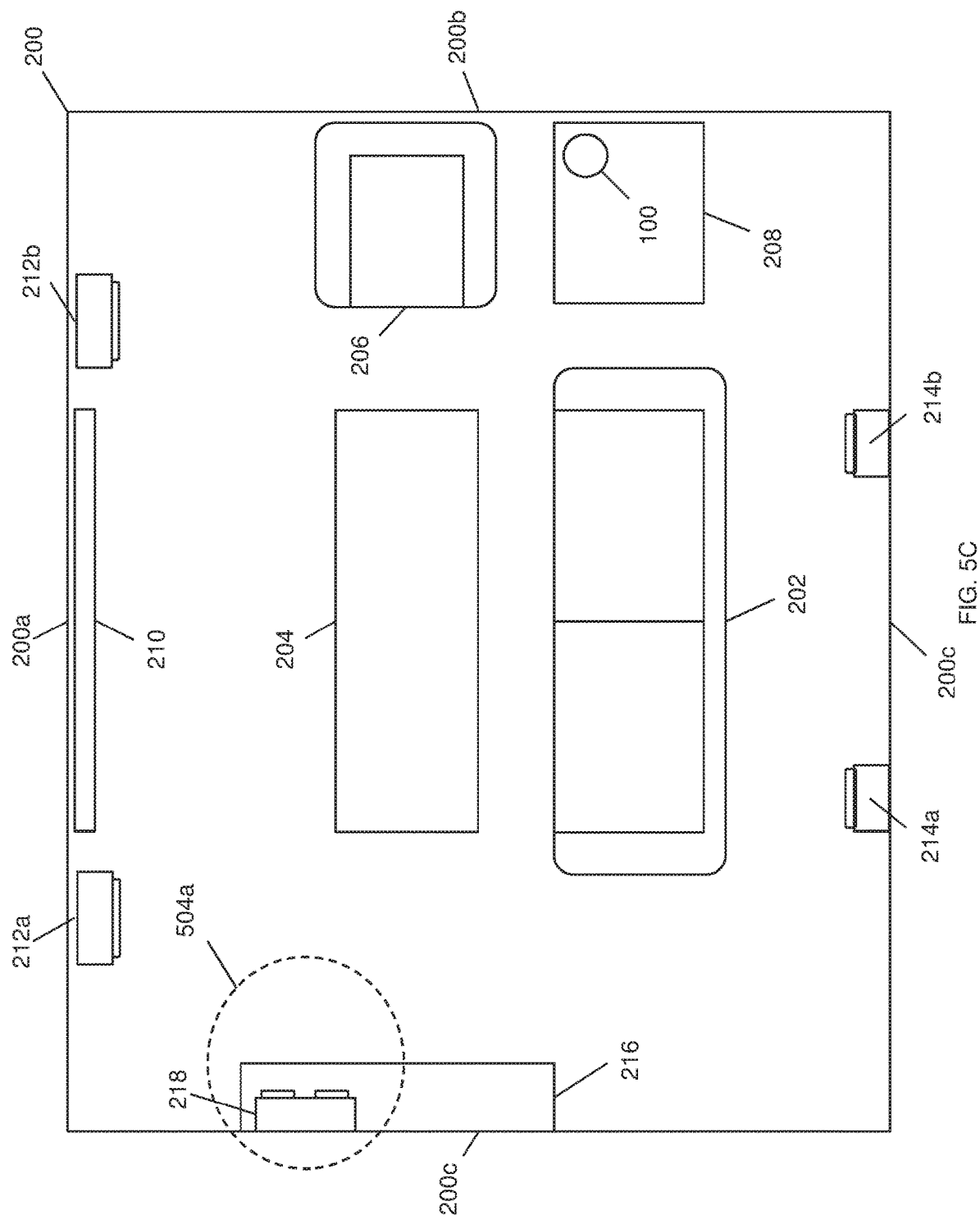
FIG. 5C is a schematic view illustrating an embodiment of detection of the directionality and distance of the audio source of FIG. 5A by the voice activated assistant device of FIG. 1.

FIG. 5C illustrates an embodiment of the voice activated assistant engine 104 utilizing the microphones 110 to detect the audio produced by the radio device 218 as illustrated in FIG. 5A in order to define a corresponding audio source and determine its relative location. Similarly as discussed in the example above, the configuration of the microphones 110 on the chassis 102 of the voice activated assistant device 100 may provide for the detection of the audio by any subset (or all) of the microphones 110, and the voice activated assistant engine 104 may be configured to utilize that detected audio and the characteristics of the audio created under its control to determine a distance and directionality of the audio source of that audio using, for example, the triangulation techniques discussed above, as well as known volume characteristics of the audio that was produced by the audio source under control the voice activated assistant engine 104. As such, FIG. 5C illustrates the voice activated assistant engine 104 determining an area/volume 504a of the audio source provided by the radio device 218 using the distance and directionality determined for its detected audio. For example, the areas/volume 504a may be determined by estimating a location of the detected audio source based on the directionality and distance discussed above, and then defining the area/volume based on that location (e.g., defining a circular area or spherical volume with a boundary that is based on that location as illustrated in FIG. 5C). Area/volume information associated with the area/volume 504a may then be stored in the voice activated assistant database 106 as area/volume coordinates, audio information associated with any of the microphones 110, and/or a variety of other information that would be apparent to one of skill in the art in possession of the present disclosure as providing for identification of the area/volume 504a of the audio sources discussed above.

As such, the voice activated assistant engine 104 may be configured to cause any audio-producing devices under its control (e.g., any speaker device paired/connected to the voice activated assistant device 100) to cause that device to produce audio in order to detect that audio, define an audio source, determine a relative location of that audio source, and store that relative location in the voice activated assistant database 106. Furthermore, as discussed above, in other embodiments the relative locations determined as discussed above may be sent through the network 116 to the voice activated assistant system 118 for storage at block 302.

Figure 6A:
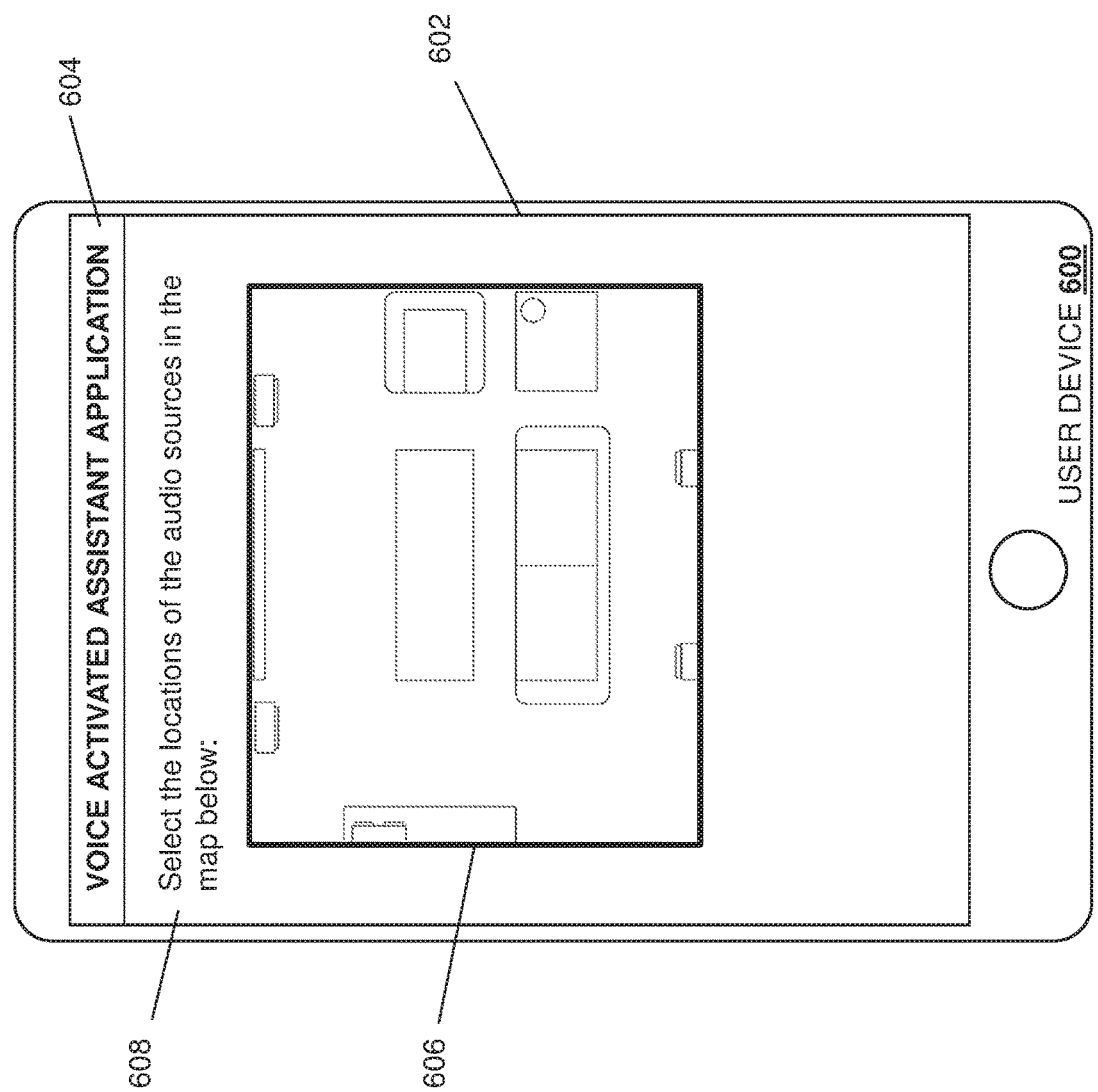
FIG. 6A is a screen shot illustrating an embodiment of a user device displaying an audio source designation screen provided by a voice activated assistant application.

In another example of block 302, a user may provide the relative location(s) of audio source(s) to the voice activate assistant engine 104 for storage. Referring to FIG. 6A, an embodiment of a user device 600 is illustrated that includes a display device 602 displaying a voice activated assistant application 604. For example, the voice activated assistant application 604 may be provided on the user device 600 for use in setting up, maintaining, and/or otherwise controlling the voice activated assistant device 100. Thus, at block 302, the user may utilize the user device 600 to launch the voice activated assistant application 604 in order to define the audio sources and provide their relative locations as part of, for example, a set up process for the voice activated assistant device 100.

In the illustrated embodiment, the voice activated assistant application 604 includes a room map 606 and an instruction to select the locations of audio sources in the room 200 using the room map 606. While the room map 606 is illustrated in FIGS. 6A and 6B in two dimension, as discussed below, the provisioning of a room map 606 may be provided by voice activated assistant application 604 as a three-dimensional mapping of the room 200 that includes at least some of the elements included in that room 200 while remaining within the scope of the present disclosure.

In some embodiments, the voice activated assistant application 604 may enable the user to create the room map 606 via application tools that allow the user to define the relative locations of different elements in the room 200. In one specific example, the voice activated assistant application 604 may allow the user to define the dimensions of the room (e.g., 25 feet by 50 feet by 12 feet), as well as define the size and location of elements in the room by, for example, defining dimensions of the couch 202 (e.g., 4 feet by 9 feet by 3 feet) and providing a relative location of the couch 200 in the room 200 (e.g., by providing a graphical element having the dimensions provided for the couch 202, and allowing the user to manipulate that graphical element to place it on the room map 606 in a location corresponding to the location of the couch 202 in the room 200). In particular and with regard to the specific example of the room 200 discussed below, the user may define the locations of the voice activated assistant device 100, the front speaker devices 212a/212b, the rear speaker devices 214a/214b, and the radio device 218. As such, the user may generate the room map 606 prior to its display in FIG. 6A.

In another embodiments, the voice activated assistant application 604 may be configured to create the room map 606 via room mapping features provided on the voice activate assistant device 100. In one specific example, the voice activated assistant device 100 and/or the user device 600 may include cameras, and the voice activated assistant application 604 may utilize camera images or video from those cameras, as well as 3-dimensional data capturing devices included in the voice activated assistant device 100 and/or user device 600 in order to determine information about the location and dimensions of the room 200 and elements in that room 200. As such, the room map 606 may be automatically generated by the voice activated assistant device 100 prior to its display in FIG. 6A via the voice activated assistant application 604.

Figure 6B:
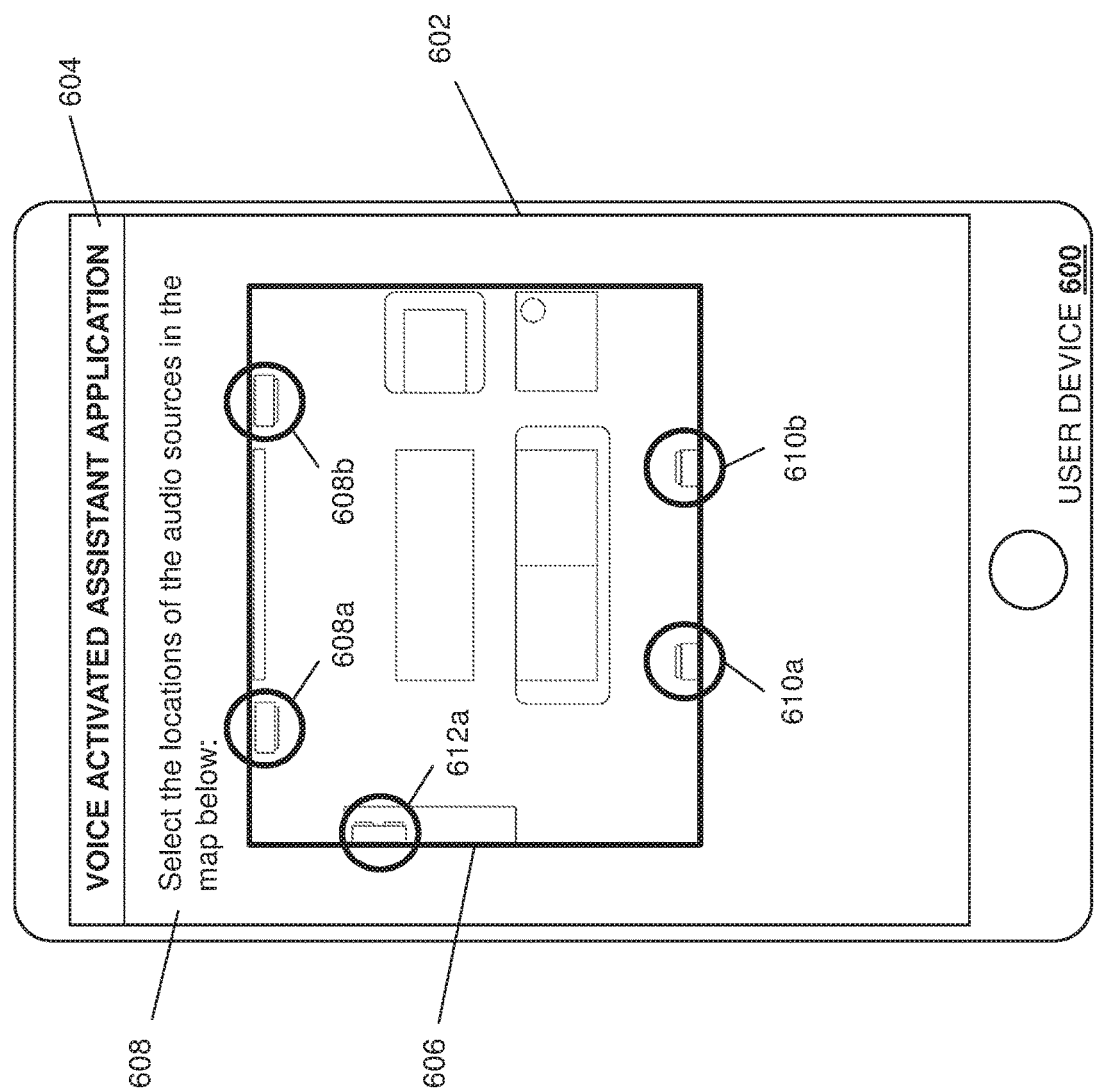
FIG. 6B is a screen shot illustrating an embodiment of a user device displaying selections made on the audio source designation screen of FIG. 6A.

With reference to FIG. 6B, at block 302, the user may utilize the user device 600 (e.g., a touch-sensitive display screen 602) in order to select the relative locations of audio sources and have those selections provided to the voice activated assistant device 100. For example, FIG. 6B illustrates the user having provided selections 608a and 608b to indicate the relative locations of the front speaker devices 212a and 212b, and having provided selections 610a and 610b to indicate the relative locations of the rear speaker devices 214a and 214b. In response to receiving those selections 608a, 608b, 610a, and 610b (e.g., via a communication received by the voice activated assistant engine 104 via its communication subsystem 108 from the user device 600), the voice activated assistant engine 104 may then determine and store directionality information (e.g., similar to that described above with reference to FIG. 4B) and/or directionality/distance information (e.g., similar to that described above with reference to FIG. 4C) in the voice activated assistant database 106.

FIG. 6B also illustrates the user having provided a selection 612a to indicate the relative location of the radio device 218. In response to receiving that selection 612a (e.g., via a communication received by the voice activated assistant engine 104 via its communication subsystem 108 from the user device 600), the voice activated assistant engine 104 may then determine and store directionality information (e.g., similar to that described above with reference to FIG. 5B) and/or directionality/distance information (e.g., similar to that described above with reference to FIG. 5C) in the voice activated assistant database 106.

As such, a user may utilize a graphical user interface on a user device to provide the voice activated assistant engine 104 a relative location of any audio source in the vicinity of the voice activated assistant device 100, and the voice activated assistant engine 104 may store those relative location(s) in the voice activated assistant database 106. Furthermore, as discussed above, in other embodiments, the relative locations received from the user as discussed above may be sent through the network 116 to the voice activated assistant system 118 for storage at block 302.

In yet another example, the voice activated assistant engine 104 may determine the relative locations of audio sources during regular operation of the voice activated assistant device 100. For example, as discussed above and in further detail below, during regular operation the voice activated assistant engine 104 may be configured to use the microphones to monitor and detect the use of an activation command, which may be configured (based on the relative location of the audio source that provides that activation command) to cause the voice activated assistant engine 104 to record a subsequent instruction command and send that instruction command over the network 116 for execution by the voice activated assistant system 118. However, upon initial setup of the voice activated assistant device 100 (e.g., following the voice activated assistant device 100 being first positioned in the room 200 and initialized), the voice activated assistant engine 104 may be configured to detect audio sources and determine their relative locations in response to the detection of activation commands provided from those audio sources.

In some embodiments, at block 302, the voice activated assistant engine 104 may detect the activation command and, in response, request a confirmation that the activation command should result in the execution of a subsequent instruction command. For example, in response to detecting the activation command, the voice activated assistant engine 104 may determine a relative location of an audio source that provided that activation command (e.g., via the techniques discussed above for determining the directionality or directionality/distance discussed above). The voice activated assistant engine 104 may then determine whether an activation command has been previously received from that relative location (e.g., from a particular direction, from an area/volume, etc.). If the activation command has not been previously received from that relative location, the voice activated assistant engine 104 may request a confirmation whether a subsequent instruction command should be executed (e.g., "I've detected a request from a new location in the room—is the request valid?"). In response to a user confirming that the subsequent instruction command should be executed, the voice activated assistant engine 104 may associate that relative location with authorized activation commands, and provide the subsequent instruction command through the network 116 to the voice activated assistant system 118. As such, when a subsequent activation command is detected from a relative location associated with authorized activation commands, the voice activated assistant engine 104 may not request any confirmation to execute the subsequent instruction command.

In response to a user instructing the voice activated assistant engine 104 that the subsequent instruction command should not be executed (e.g., "No—that was the television"), the voice activated assistant engine 104 may associate that relative location with unauthorized activation commands, and present the subsequent instruction command from being sent through the network 116 to the voice activated assistant system 118. As such, as discussed below, when a subsequent activation command is detected from a relative location associated with unauthorized activation commands, the voice activated assistant engine 104 will not request any confirmation to execute the subsequent instruction command, and will prevent the sending of subsequent instruction commands coming from that relative location through the network 116 as discussed in further detail below.

As such, the voice activated assistant engine 104 may detect audio sources providing activation commands from new relative locations, and may communicate with a user to determine whether to associate those relative location(s) in the voice activated assistant database 106 with authorized or unauthorized activation commands. Furthermore, as discussed above, in other embodiments, the relative locations associated with authorized or unauthorized activation commands may be sent through the network 116 to the voice activated assistant system 118 for storage at block 302. In some embodiments, the voice activated assistant device 100 may include location determination devices (e.g., global positioning system (GPS) devices, accelerometers, gyroscopes, etc.) that allow the voice activated assistant engine 104 to determine when the voice activated assistant device 100 has been moved, and thus the voice activated assistant engine 104 may determine that it needs to perform the audio source relative location confirmations again.

Thus, a variety of different and specific examples of determining and storing the relative locations of audio sources at block 302 have been described. However, one of skill in the art in possession of the present disclosure will recognize that the operations discussed above to determine the relative locations of audio sources may be modified and/or combined, and other techniques for determining audio source relative locations may fall within the scope of the present disclosure as well. For example, a user may use techniques similar to those discussed above to move to a position in the room 200, speak, and have the voice activated assistant engine 104 detect the user speaking, determine that relation location of the user's position in the room 200, and store that relative location in the voice activated assistant database 106. As such, non-device audio (e.g., a user speaking) may result in an audio source relative location being stored at block 302 which, as discussed below, allows the voice activated assistant engine 104 to later "ignore" any audio detected at that relative location that results from a user speaking.

The method 300 then proceeds to block 304 where the voice activated assistant device detects an activation command. In an embodiment, at block 304, the voice activated assistant device 100 utilizes the microphones 110 to detect an activation command. For example, activation commands may include "ALEXA®" for the AMAZON® ECHO® discussed above, "OK GOOGLE®" for the GOOGLE® HOME® discussed above, and "HEY SIRI®" for the APPLE® HOMEPOD®, and the voice activated assistant engine 104 may monitor for audio that includes that activation command during regular operation (e.g., subsequent to the initialization of the voice activated assistant device 100). As would be understood by one of skill in the art, the activation command detected by the voice activated assistant device may be immediately followed by detected audio that is referred to below as an instruction command (e.g., "buy sodas"), and as discussed below, in some embodiments the voice activated assistant engine 104 may operate to record that instruction command, while in other embodiments, the determination of an unauthorized activation command may result in the voice activated assistant device either preventing the recording of a subsequent instruction command, or immediately erasing a subsequent instruction command that was recorded. As such, an "instruction command" as used herein may be considered any audio detected immediately subsequent to the activation command, regardless of whether that that instruction command is executed.

The method 300 then proceeds to block 306 where the voice activated assistant device determines the source location of the activation command. In an embodiment, at block 306, the voice activated assistant engine 104 operates to determine a directionality, or a directionality and distance, of the activation command detected at block 304. For example, the voice activated assistant engine 104 may utilize the audio data received by the microphones 110 in detecting the activation command at block 304 in order to determine a directionality and, in some embodiments, a distance of the audio source providing that activation command using, for example, triangulation techniques that are based on the relative differences in the time required for the same audio to reach the different microphones 110, and in some embodiments, a volume of that audio. However, while a particular technique for determining the directionality or directionality/distance of an audio source providing an activation command has been described, one of skill in the art in possession of the present disclosure will recognize that other techniques for determining a relative location of an audio source providing an activation command will fall within the scope of the present disclosure as well.

The method 300 then proceeds to decision block 308 where the voice activated assistant device determines whether the source location of the activation command matches a relative location of an audio source. In an embodiment, at decision block 308, the voice activated assistant engine 104 compares the directionality or the directionality/distance determined for the audio source that provided the activation command with the relative locations of the audio sources that were stored in the voice activated assistant database 106 at block 302. Furthermore, in some embodiment, the voice activated assistant engine 104 may send the directionality or the directionality/distance determined for the audio source that provided the activation command over the network 116 to the voice activated assistant system 118, and the voice activated assistant system 119 may operation to compare that information to the relative locations of the audio sources that were sent to the in the voice activated assistant system 118 at block 302.

As such, with reference to the specific examples discussed above, at decision block 308, the directionality determined for the audio source that provided the activation command may be compared to the stored relative locations of audio sources to determine whether it matches or corresponds to any of the directionalities 404a, 404b, 406a, or 406b illustrated in FIG. 4B, or the directionality 502a illustrated in FIG. 5B. Similarly, at decision block 308, the directionality and distance determined for the audio source that provided the activation command may be compared to the stored relative locations of audio sources to determine whether it matches or corresponds to any of the areas/volumes 408a, 404b, 410a, or 410b illustrated in FIG. 4C, or the area/volume 504a illustrated in FIG. 5C. However, while a few specific examples have been provided, one of skill in the art in possession of the present disclosure will recognize that the relative location of a detected activation command may be represented by a variety of data, and may be matched in a variety of manners to previously stored relative locations of audio sources represented by a variety of data while remaining within the scope of the present disclosure.

If, at decision block 308, the voice activated assistant device determines that the source location of the activation command matches the relative location of an audio source, the method 300 then proceeds to block 310 where the voice activated assistant device prevents a subsequent instruction command from being sent through a network. In an embodiment, at block 310, the voice activated assistant engine 104 determines that the directionality or the directionality/distance determined for the audio source that provided the activation command matches a relative location of an audio source that was stored in the voice activated assistant database 106 at block 302 and, in response, prevents an instruction command that was provided immediately subsequent to the activation command from being sent through the network to the voice activated assistant system 118.

For example, at block 310, the voice activated assistant engine 104 may determine the directionality determined for the audio source that provided the activation command matches or corresponds to one of the directionalities 404a, 404b, 406a, or 406b illustrated in FIG. 4B, or the directionality 502a illustrated in FIG. 5B and, in response, prevents an instruction command that was provided immediately subsequent to the activation command from being sent through the network to the voice activated assistant system 118. In another example, at block 310, the voice activated assistant engine 104 may determine the directionality and distance determined for the audio source that provided the activation command matches or corresponds to one of the areas/volumes 408a, 404b, 410a, or 410b illustrated in FIG. 4C, or the area/volume 504a illustrated in FIG. 5C and, in response, prevents an instruction command that was provided immediately subsequent to the activation command from being sent through the network to the voice activated assistant system 118.

In some embodiments, the prevention of the subsequent instruction command from being sent through the network to the voice activated assistant system 118 may include the voice activated assistant engine 104 preventing a recording of the instruction command from being sent through the network to the voice activated assistant system 118 or, in some cases, immediately erasing such a recording (e.g., from the voice activated assistant database 106).

In other embodiments, the prevention of the subsequent instruction command from being sent through the network to the voice activated assistant system 118 may include the voice activated assistant engine 104 preventing the recording of the subsequent instruction command (i.e., the determination that the source location of the audio source that provided activation command matches/corresponds to a stored audio source relative location may be performed quickly enough that any recording that the voice activated assistant device is configured to perform subsequent to detecting the activation command is prevented).

In situations where the voice activated assistant system 118 performs decision block 308, the prevention of the subsequent instruction command from being sent through the network to the voice activated assistant system 118 may include the voice activated assistant system 118 instructing the voice activated assistant engine 104 to prevent a recording of the instruction command from being sent through the network to the voice activated assistant system 118 and, in some cases, to immediately erase that recording (e.g., from the voice activated assistant database 106). Similarly, the prevention of the subsequent instruction command from being sent through the network to the voice activated assistant system 118 may include the voice activated assistant system 118 instructing the voice activated assistant engine 104 to prevent the recording of the subsequent instruction command (i.e., the determination that the source location of the audio source that provided activation command matches/corresponds to a stored audio source relative location may be performed quickly enough that any recording that the voice activated assistant device is configured to perform subsequent to detecting the activation command is prevented by a communication from the voice activated assistant system 118 through the network 116).

If, at decision block 308, the voice activated assistant device determines that the source location of the activation command does not match the relative location of an audio source, the method 300 then proceeds to block 312 where the voice activated assistant device allows a subsequent instruction command to be sent through a network. In an embodiment, at block 312, the voice activated assistant engine 104 determines that the directionality or the directionality/distance determined for the audio source that provided the activation command does not match a relative location of an audio source that was stored in the voice activated assistant database 106 at block 302 and, in response, allows an instruction command that was provided immediately subsequent to the activation command to be sent through the network to the voice activated assistant system 118.

For example, at block 312, the voice activated assistant engine 104 may determine the directionality determined for the audio source that provided the activation command does not match or correspond to any of the directionalities 404a, 404b, 406a, or 406b illustrated in FIG. 4B, or the directionality 502a illustrated in FIG. 5B and, in response, allow an instruction command that was provided immediately subsequent to the activation command to be sent through the network to the voice activated assistant system 118. In another example, at block 312, the voice activated assistant engine 104 may determine the directionality and distance determined for the audio source that provided the activation command does not match or correspond to any of the areas/volumes 408a, 404b, 410a, or 410b illustrated in FIG. 4C, or the area/volume 504a illustrated in FIG. 5C and, in response, allow an instruction command that was provided immediately subsequent to the activation command to be sent through the network to the voice activated assistant system 118. In situations where the voice activated assistant system 118 performs decision block 308, the allowing of the subsequent instruction command to be sent through the network to the voice activated assistant system 118 may include the voice activated assistant system 118 instructing the voice activated assistant engine 104 to allow a recording of the instruction command from being sent through the network to the voice activated assistant system 118.

Furthermore, in some embodiments, the determination that the source location of the activation command matches the relative location of an audio source at decision block 310 may result in other actions by the voice activated assistant engine 104 that cause the subsequent instruction command to be prevented from or allowed to be sent through the network. In an embodiment, the determination that the source location of the activation command matches the relative location of an audio source may cause the voice activated assistant engine 104 to determine a priority of the subsequent instruction command and prevent or allow that instruction command based on the priority. For example, if such an instruction command is subsequent to an activation command that has a source location that matches the relative location of an audio source, it may be allowed to be sent over the network if it is simply a request for information, while it may be prevented from being sent through the network if it is an instruction to purchase a product. In another embodiment, the determination that the source location of the activation command matches the relative location of an audio source may cause the voice activated assistant engine 104 to request confirmation of the subsequent instruction command from the user, and prevent that instruction command from being sent over the network if the user provides an audible instruction to deny that instruction command or does not provide an audible instruction to allow that instruction command.

Thus, systems and methods for preventing the accidental or unauthorized activation of a voice activated assistant device have been described that prevent such voice activated assistant devices from being maliciously or accidently activated via intentional but unauthorized speaking of the activating command, or the speaking of words or phrases that sound like the activating command. For example, the systems and methods of the present disclosure operate to prevent an unauthorized activation command originating from audio device such as television speakers or radios from resulting in the execution of a subsequent instruction command. As such, news stories, advertisements, and/or other audio that may include the activation command (e.g., either unintentionally or intentionally as the result of a prank) will not result in the execution of a subsequent instruction command. The detection of the authorized activation command may be utilized to prevent unwanted recording of any subsequently spoken words, and reduce the possibility of unauthorized online transactions being performed by a network connected server system, thus increasing privacy, and reducing or eliminating the need to reverse unauthorized transactions conducted by voice activated assistant devices.

Furthermore, the voice activated assistant engine 104 may be configured to prevent audio sources under its control from emitting audio that includes the activation command. For example, the voice activated assistant device 100 may include a buffer that stores audio content that is to-be transmitted to an audio device (e.g., the audio devices that are external to the chassis 102 of the voice activated assistant device 100, the internal speaker subsystem 112 in the chassis 102 of the voice activated assistant device 100, etc.), and the voice activated assistant engine 104 may operate to analyze that content to determine whether it includes the activation command for the voice activated assistant device 100 (or activation commands associated with other voice activated assistant devices). In the event the voice activated assistant engine 104 determines that the content in the buffer includes the activation command, the voice activated assistant engine 104 may mute the output of that activation command, reduce the volume at which the audio device emits that activation command, add noise or other audio artifacts to the portion of the content that includes that activation command, and/or perform any other action that would be apparent to one of skill in the art in possession of the present disclosure in order to prevent that activation command from subsequently being detected by the voice activated assistant engine 104.

Figure 7:
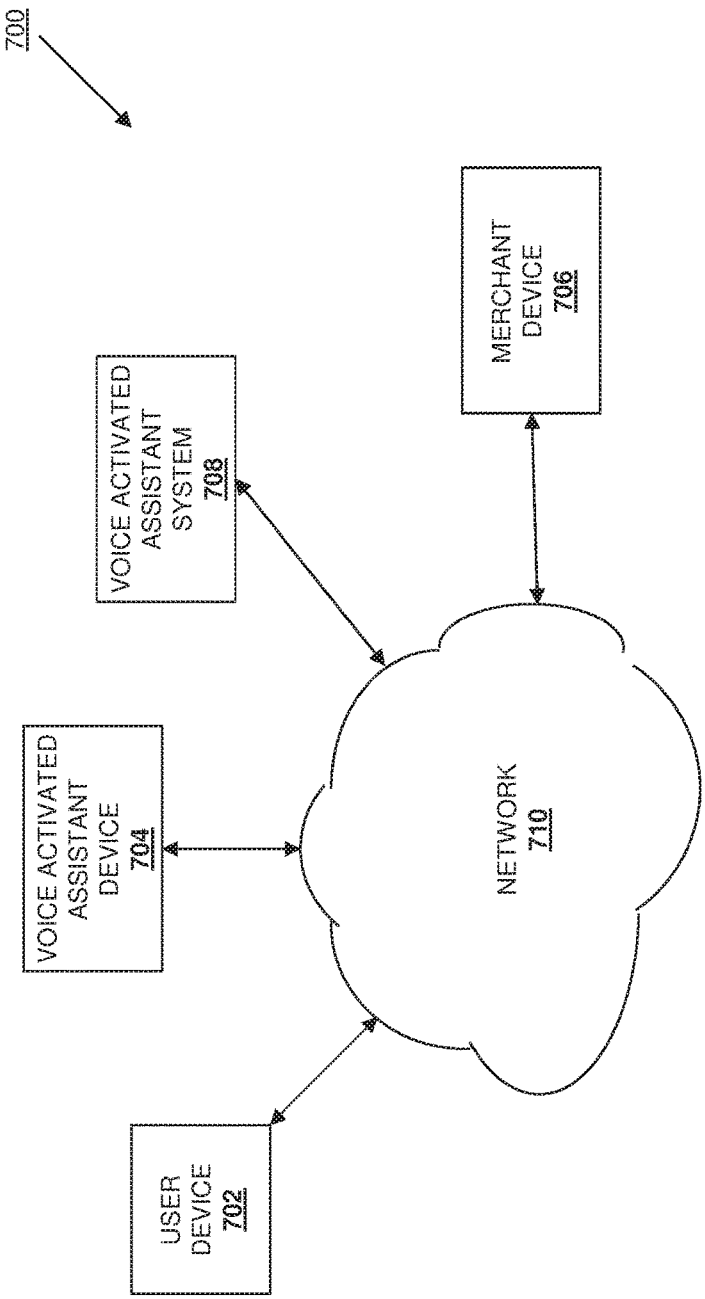
FIG. 7 is a schematic view illustrating an embodiment of a networked system.

Referring now to FIG. 7, an embodiment of a network-based system 700 for implementing one or more processes described herein is illustrated. As shown, network-based system 700 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 7 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 700 illustrated in FIG. 7 includes a user device, a voice activated assistant device 704, a merchant device 706, and a voice activated assistant system 708 in communication over a network 710. The user device 702 may be the user device 600, discussed above. The voice activated assistant device 704 may be the voice activated assistant device 100 discussed above. The merchant devices 706 may be a merchant device that is operated by a merchant and that allows a user to make online purchases using the voice activated assistant device 100/704. The voice activated assistant system 708 may be the voice activated assistant system 108 discussed above.

The user device, the voice activated assistant device 704, the merchant device 706, and the voice activated assistant system 708 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 710.

The network 710 may be implemented as a single network or a combination of multiple networks. For example, in various embodiments, the network 710 may include the Internet and/or one or more intranets, landline networks, wireless networks, and/or other appropriate types of networks.

The user device 702 and/or the voice activated assistant device 704 may be implemented using any appropriate combination of hardware and/or software configured for wired and/or wireless communication over network 710. For example, in one embodiment, the user device 702 and/or the voice activated assistant device 704 may be implemented as a personal computer of a user in communication with the Internet. In other embodiments, the user device 702 and/or the voice activated assistant device 704 may be a smart phone, personal digital assistant (PDA), laptop computer, and/or other types of computing devices.

The user device 702 and/or the voice activated assistant device 704 may include one or more browser applications which may be used, for example, to provide a convenient interface to permit the user to browse information available over the network 710. For example, in one embodiment, the browser application may be implemented as a web browser configured to view information available over the Internet.

The user device 702 and/or the voice activated assistant device 704 may also include one or more toolbar applications which may be used, for example, to provide user-side processing for performing desired tasks in response to operations selected by the user. In one embodiment, the toolbar application may display a user interface in connection with the browser application.

The user device 702 and/or the voice activated assistant device 704 may further include other applications as may be desired in particular embodiments to provide desired features to the user device 702 and/or the voice activated assistant device 704. In particular, the other applications may include a payment application for payments assisted by a payment service provider through a payment service provider. The other applications may also include security applications for implementing user-side security features, programmatic user applications for interfacing with appropriate application programming interfaces (APIs) over the network 710, or other types of applications. Email and/or text applications may also be included, which allow the user to send and receive emails and/or text messages through the network 710. The user device 702 and/or the voice activated assistant device 704 may include one or more user and/or device identifiers which may be implemented, for example, as operating system registry entries, cookies associated with the browser application, identifiers associated with hardware of the user device 702 and/or the voice activated assistant device 704, or other appropriate identifiers, such as a phone number. In one embodiment, the user identifier may be used to associate the user with a particular account as further described herein.

The merchant device 706 may be maintained, for example, by a conventional or online merchant, conventional or digital goods seller, individual seller, and/or application developer offering various products and/or services in exchange for payment to be received conventionally or over the network 710. In this regard, the merchant device 706 may include a database identifying available products and/or services (e.g., collectively referred to as items) which may be made available for viewing and purchase by the user.

The merchant device 706 may also include a checkout application which may be configured to facilitate the purchase by the payer of items. The checkout application may be configured to accept payment information from the user through the user device 702 and/or the voice activated assistant device 704.

Figure 8:
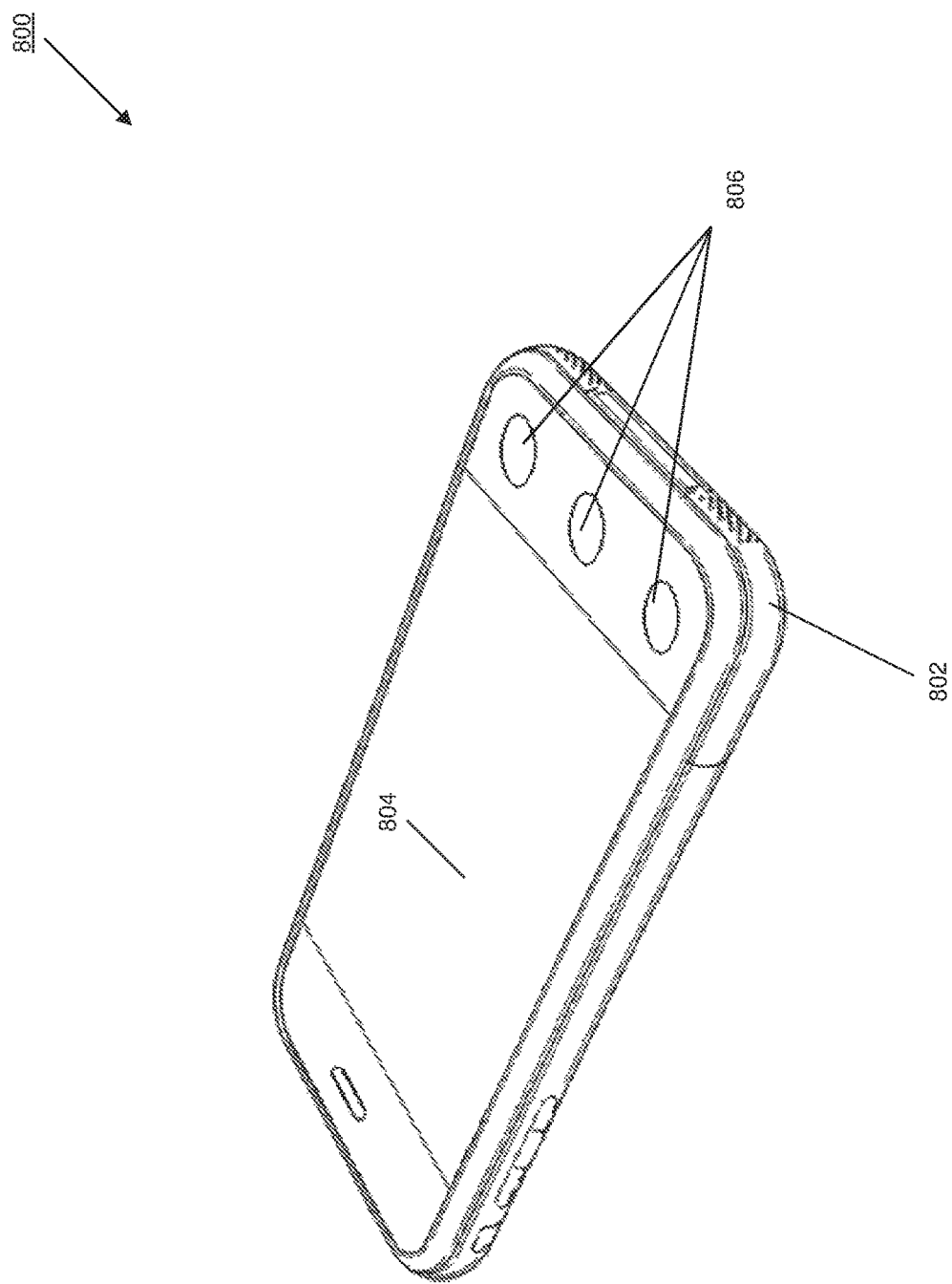
FIG. 8 is a perspective view illustrating an embodiment of a user device.

Referring now to FIG. 8, an embodiment of a user device 800 is illustrated. The user device 800 may be the users devices discussed above. The user device 800 includes a chassis 802 having a display 804 and an input device including the display 804 and a plurality of input buttons 806. One of skill in the art will recognize that the user device 800 is a portable or mobile phone including a touch screen input device and a plurality of input buttons that allow the functionality discussed above with reference to the method 600. However, a variety of other portable/mobile user devices and/or desktop user devices may be used in the method 300 without departing from the scope of the present disclosure.

Figure 9:
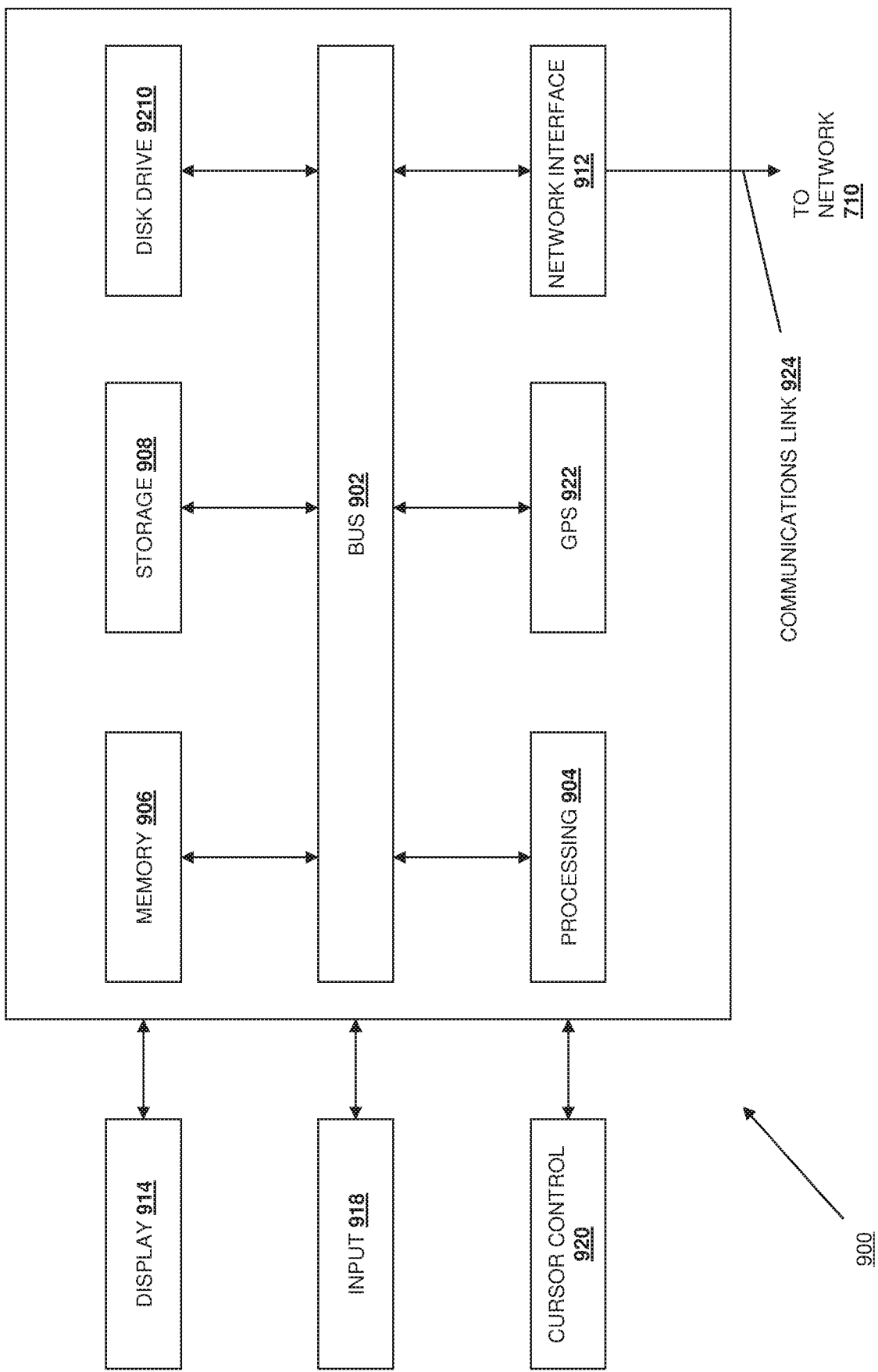
FIG. 9 is a schematic view illustrating an embodiment of a computer system.

Referring now to FIG. 9, an embodiment of a computer system 900 suitable for implementing, for example, the user device 702 and/or the voice activated assistant device 704, is illustrated. It should be appreciated that other devices utilized by users in the system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 8920 (e.g., mouse, pointer, or trackball), and/or a location determination component 922 (e.g., a Global Positioning System (GPS) device as illustrated, a cell tower triangulation device, and/or a variety of other location determination devices known in the art.) In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the user device 702 and/or the voice activated assistant device 704. Such instructions may be read into the system memory component 906 from another computer readable medium, such as the static storage component 908 or the disk drive component 910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 924 to the network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A voice activated assistant activation prevention system, comprising:
 a database storing audio source information comprising a respective relative physical location for each of a plurality of machine-based audio sources that are co-located in a common physical area; and
 one or more hardware processors coupled to a non-transitory memory and configured to read instructions to cause the system to perform operations comprising:
 monitoring, using at least one microphone, for an activation command that is associated with a recording of a subsequent instruction command and a sending of the subsequent instruction command through a network;
 detecting, using first audio information received by the at least one microphone, a first instance of the activation command in the common physical area;
 determining a source physical location of the first instance of the activation command in the common physical area;
 determining that the source physical location of the first instance of the activation command matches the relative physical location(s) in the common physical area of at least one of the plurality of machine-based audio sources stored in the database;
 determining, in response to the matching, that an instruction command that immediately follows the first instance of the activation command includes a purchase instruction;
 determining that the instruction command that immediately follows the first instance of the activation command includes the purchase instruction and is unauthorized, in response to determining that the source physical location of the first instance of the activation command in the common physical area matches the relative physical location(s) in the common physical area of the at least one of the plurality of machine based audio sources; and
 preventing the sending of the unauthorized purchase instruction through the network.

2. The system of claim 1, wherein the operations further comprise:
 detecting, using second audio information received by the at least one microphone, audio from at least one of the plurality of machine-based audio sources;
 determining, based at least partially on the second audio information, the respective relative physical location(s) of the at least one of the plurality of machine-based audio sources; and
 storing the respective relative physical location(s) of the at least one of the plurality of machine-based audio sources in the database.

3. The system of claim 2, wherein the determining the respective relative physical location(s) of at least one of the plurality of machine-based audio sources further comprises:
 determining a respective direction of each of at the least one of the plurality of machine-based audio sources from the at least one microphone;
 determining a respective distance of each of at the least one of the plurality of machine-based audio sources from the at least one microphone; and
 storing each respective direction(s) and respective distance(s) in the database.

4. The system of claim 1, wherein the operations further comprise:
 receiving, through the network via a graphical user interface displayed on a user device, a designation of the relative physical location(s) of at least one of the plurality of machine-based audio sources; and
 storing the relative physical location(s) of the at least one of the plurality of machine-based audio sources in the database.

5. The system of claim 1, wherein the operations further comprise:

detecting, using second audio information received by the at least one microphone, a second instance of the activation command;
determining a source physical location of the second instance of the activation command;
determining that the source physical location of the second instance of the activation command does not match the relative physical location(s) of at least one of the plurality of machine-based audio sources stored in the database; and
allowing, in response to determining that the source physical location of the activation command does not match the relative physical location(s) of the at least one of the plurality of machine-based audio sources, the sending through the network of an instruction command that follows the second instance of the activation command.

6. A method for preventing activation of a voice activated assistant device, comprising:
detecting, by a voice activated assistant device using first audio information received by at least one microphone, a first instance of an activation command;
determining, by the voice activated assistant device, a source physical location of the first instance of the activation command;
determining, by the voice activated assistant device, that the source physical location of the first instance of the activation command matches a relative physical location in a common physical area of at least one of a plurality of machine-based audio sources that were previously stored in a database, wherein the plurality of machine-based audio sources are co-located in the common physical area;
determining, by the voice activated assistant device in response to determining that the source physical location of the first instance of the activation command matches the relative physical location in the common physical area of the at least one of the plurality of machine-based audio sources that were previously stored in the database, that an instruction command that immediately follows the first instance of the activation command includes a purchase instruction;
determining that the instruction command that immediately follows the first instance of the activation command includes the purchase instruction and is unauthorized; and
preventing the sending of the unauthorized purchase instruction through a network.

7. The method of claim 6, further comprising:
detecting, by the voice activated assistant device using second audio information received by the at least one microphone, audio from at least one of the plurality of machine-based audio sources;
identifying, by the voice activated assistant device based at least partially on the second audio information, the relative physical location(s) of the at least one of the plurality of machine-based audio sources; and
storing, by the voice activated assistant device, the respective relative physical location(s) of the at least one of the plurality of machine-based audio sources in the database.

8. The method of claim 7, wherein the determining the respective relative physical location(s) of at least one of the plurality of machine-based audio sources further comprises:

identifying, by the voice activated assistant device, a respective direction of the at least one of the plurality of machine-based audio sources from the at least one microphone;
identifying, by the voice activated assistant device, a respective distance of the at least one of the plurality of machine-based audio sources from the at least one microphone; and
storing, by the voice activated assistant device, each respective direction and each respective distance in the database.

9. The method of claim 6, further comprising receiving, by the voice activated assistant device through the network via a graphical user interface displayed on a user device, a designation of the relative physical location(s) of at least one of the plurality of machine-based audio sources; and
storing, by the voice activated assistant device, the relative physical location(s) of the at least one of the plurality of machine-based audio sources in the database.

10. The method of claim 6, further comprising:
detecting, by the voice activated assistant device using second audio information received by the at least one microphone, a second instance of the activation command;
determining, by the voice activated assistant device, a source physical location of the second instance of the activation command;
determining, by the voice activated assistant device, that the source physical location of the second instance of the activation command does not correspond to the relative physical location(s) of at least one of the plurality of machine-based audio sources described by the audio source information that was previously stored in the database; and
allowing, by the voice activated assistant device in response to determining that the source physical location of the activation command does not correspond to the relative physical location(s) of the at least one of the plurality of machine-based audio sources, the sending through the network of an instruction command that immediately follows the second instance of the activation command.

11. The method of claim 6, wherein the determining that the instruction command that immediately follows the first instance of the activation command includes the purchase instruction further includes determining a priority of the instruction command that immediately follows the first instance of the activation command.

12. A non-transitory machine-readable medium having stored thereon machine-readable instructions executable to cause a machine to perform operations comprising:
detecting, using at least one microphone, a first instance of an activation command that is associated with a recording of a subsequent instruction command and a sending that subsequent instruction command through a network;
determining a source physical location of the first instance of the activation command;
matching the source physical location of the first instance of the activation command to relative physical location(s) in a common physical area of at least one of a plurality of machine-based audio sources that are identified in a database and that are co-located in the common physical area;
determining, in response to the matching, that an instruction command that immediately follows the first instance of the activation command includes a purchase instruction and is unauthorized; and preventing, in response to determining that the instruction command that immediately follows the first instance of the activation command includes the purchase instruction, the sending of the unauthorized purchase instruction through the network.

13. The non-transitory machine-readable medium of claim 12, wherein the operations further comprise:

detecting, using second audio information received by the at least one microphone, audio from at least one of the plurality of machine-based audio sources;

determining, based at least partially on the second audio information, the respective relative physical location(s) of the at least one of the plurality of machine-based audio sources; and storing the respective relative physical location(s) of the at least one of the plurality of machine-based audio sources in the database.

14. The non-transitory machine-readable medium of claim 13, wherein the determining the relative physical location of the audio source further comprises:

determining a respective direction of each of at least one of the plurality of machine-based audio sources from the at least one microphone;

determining a respective distance of each of at least one of the plurality of machine-based audio sources from the at least one microphone; and storing each respective direction and each respective distance in the database.

15. The non-transitory machine-readable medium of claim 12, wherein the operations further comprise:

receiving, through the network via a graphical user interface displayed on a user device, a designation of the relative physical location(s) of at least one of the plurality of machine-based audio sources; and storing the relative physical location(s) of the at least one of the plurality of machine-based audio sources in the database.

16. The non-transitory machine-readable medium of claim 12, wherein the operations further comprise:

detecting, using the at least one microphone, a second instance of the activation command;

determining a source physical location of the second instance of the activation command;

determining that the source physical location of the second instance of the activation command does not match the relative physical location(s) of at least one of the plurality of machine-based audio sources identified in the database; and allowing, in response to determining that the source physical location of the activation command does not match the relative physical location(s) of the at least one of the plurality of machine-based audio sources, the sending through the network of an instruction command that immediately follows the second instance of the activation command.

17. The non-transitory machine-readable medium of claim 12, wherein the preventing the recording of the purchase instruction includes:

providing, using at least one speaker and in response to determining that the instruction command that immediately follows the first instance of the activation command includes the purchase instruction, an audio request to confirm the purchase instruction; and preventing, in response to not receiving a confirmation to the audio request, the recording of the purchase instruction.

18. The system of claim 1, wherein the operations further comprise:

storing audio content that is to be transmitted to the at least one of the plurality of machine-based audio sources;

determining, by analyzing the stored audio content prior to transmitting the stored audio content to the at least one of the plurality of machine-based audio sources, that the stored audio content includes a second instance of the activation command; and in response to determining that the stored audio content includes the second instance of the activation command, muting the at least one of the plurality of machine-based audio sources while the at least one of the plurality of machine-based audio sources outputs the second instance of the activation command.

19. The method of claim 6, further comprising:

storing, by the voice activated assistant device, audio content that is to be transmitted to the at least one of the plurality of machine-based audio sources;

determining, by the voice activated assistant device analyzing the stored audio content prior to transmitting the stored audio content to the at least one of the plurality of machine-based audio sources, that the stored audio content includes a second instance of the activation command; and in response to determining that the stored audio content includes the second instance of the activation command, muting, by the voice activated assistant device, the at least one of the plurality of machine-based audio sources while the at least one of the plurality of machine-based audio sources outputs the second instance of the activation command.

20. The non-transitory machine-readable medium of claim 12, wherein the operations further comprise:

storing audio content that is to be transmitted to the at least one of the plurality of machine-based audio sources;

determining, by analyzing the stored audio content prior to transmitting the stored audio content to the at least one of the plurality of machine-based audio sources, that the stored audio content includes a second instance of the activation command; and in response to determining that the stored audio content includes the second instance of the activation command, muting the at least one of the plurality of machine-based audio sources while the at least one of the plurality of machine-based audio sources outputs the second instance of the activation command.

* * * * *